(12) United States Patent
Kitahara

(10) Patent No.: US 7,640,727 B2
(45) Date of Patent: Jan. 5, 2010

(54) COMBUSTION CONTROL FOR ENGINE

(75) Inventor: Yasuhisa Kitahara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/526,489

(22) PCT Filed: Jul. 7, 2004

(86) PCT No.: PCT/JP2004/009998

§ 371 (c)(1),
(2), (4) Date: Mar. 4, 2005

(87) PCT Pub. No.: WO2005/003537

PCT Pub. Date: Jan. 13, 2005

(65) Prior Publication Data

US 2006/0005532 A1    Jan. 12, 2006

(30) Foreign Application Priority Data

Jul. 8, 2003   (JP)   ............................. 2003-193310

(51) Int. Cl.
*F01N 3/00* (2006.01)

(52) U.S. Cl. ............................. 60/285; 60/286; 60/295; 60/297; 60/300; 60/301; 60/311

(58) Field of Classification Search ................... 60/285, 60/286, 295, 300, 297, 301, 311
See application file for complete search history.

(56) References Cited

U.S. PATENT DOCUMENTS

| | | | |
|---|---|---|---|
| 4,685,290 A * | 8/1987 | Kamiya et al. ................. 60/274 |
| 5,473,887 A | 12/1995 | Takeshima et al. |
| 6,276,130 B1 * | 8/2001 | Ito et al. ........................ 60/278 |
| 6,378,297 B1 | 4/2002 | Ito et al. |
| 6,378,487 B1 * | 4/2002 | Zukouski et al. ............. 123/299 |
| 6,412,276 B1 * | 7/2002 | Salvat et al. ................... 60/295 |
| 6,449,946 B2 * | 9/2002 | Kuji et al. ...................... 60/286 |
| 6,536,209 B2 * | 3/2003 | Fluga et al. ................... 60/284 |
| 6,688,279 B2 * | 2/2004 | Ishikawa et al. ............. 123/299 |
| 6,763,799 B2 * | 7/2004 | Ito et al. ...................... 123/299 |
| 6,796,118 B2 * | 9/2004 | Kitahara ....................... 60/285 |
| 6,804,952 B2 * | 10/2004 | Sasaki et al. .................. 60/284 |
| 6,901,747 B2 * | 6/2005 | Tashiro et al. ................. 60/286 |
| 2004/0163378 A1 * | 8/2004 | Sasaki et al. .................. 60/284 |

(Continued)

FOREIGN PATENT DOCUMENTS

| | | |
|---|---|---|
| DE | 100 37 215 A1 | 3/2001 |
| EP | 1 035 315 A2 | 9/2000 |
| EP | 1 063 427 A2 | 12/2000 |
| EP | 1 132 606 A2 | 9/2001 |
| EP | 1 302 650 A2 | 4/2003 |

(Continued)

OTHER PUBLICATIONS

"New Diesel V8 for S-Class," Automotive Engineering, Society of Automotive Engineers, vol. 109, No. 1, Jan. 2001, pp. 78-80.

*Primary Examiner*—Thomas E Denion
*Assistant Examiner*—Diem Tran
(74) *Attorney, Agent, or Firm*—Foley & Lardner LLP

(57) ABSTRACT

A combustion control apparatus for an internal combustion engine, includes an exhaust purifier in an exhaust passage, and a combustion controlling actuator such as a fuel injector to cause main combustion, and to cause preliminary combustion prior to the main combustion. A controller controls fuel injection to produce the preliminary combustion at or near top dead center, and controls fuel injection to start the main combustion after an end of the preliminary combustion.

38 Claims, 22 Drawing Sheets

FOREIGN PATENT DOCUMENTS

| | | |
|---|---|---|
| EP | 1 318 289 A1 | 6/2003 |
| EP | 1 424 481 A2 | 6/2004 |
| JP | 2600492 B2 | 1/1997 |
| JP | 2000-320386 A | 11/2000 |
| JP | 2001-073860 A | 3/2001 |

* cited by examiner

TARGET FUEL INJECTION TIMING FOR MAIN COMBUSTION

DPF EXHAUST PRESSURE THRESHOLD

TARGET INTAKE AIR QUANTITY
FOR RICH SPIKE OPERATION

TARGET INTAKE AIR QUANTITY FOR PREVENTION OF DPF MELTING

TARGET FUEL INJECTION QUANTITY
FOR PRELIMINARY COMBUSTION

TARGET FUEL INJECTION TIMING
FOR PRELIMINARY COMBUSTION

COMBUSTION CONTROL FOR ENGINE

TECHNICAL FIELD

The present invention relates to technique of controlling combustion in an internal combustion engine.

BACKGROUND ART

EP1035315 A2 (corresponding to JP2000-320386 A) shows a fuel injection system for a diesel engine, arranged to inject fuel in a basic fuel injection quantity corresponding to a required engine torque or in an increased fuel injection quantity, by three split injections near a compression top dead center of each cylinder, with a fuel injector, to promote warm-up of a catalyst.

DISCLOSURE OF INVENTION

However, in this fuel injection system, fuel is injected in such a manner that combustion is continuous, and fuel injected by the three injections is burned continuously. Therefore, fuel in a subsequent injection is injected into flame of the fuel previously injected, and burned mainly in diffusive combustion. If the air-fuel ratio is lowered in such a combustion state, a smoke emission level is increased considerably.

It is an object of the present invention to provide combustion control system and/or method for reducing smoke emissions and realizing a rich target exhaust air-fuel ratio.

According to one aspect of the present invention, a combustion control apparatus for an internal combustion engine, comprises: an exhaust purifier in an exhaust passage of the internal combustion engine; a combustion controlling actuator to cause main combustion, and to cause preliminary combustion prior to the main combustion; and a controller to control fuel injection to produce the preliminary combustion, and to control fuel injection to start the main combustion after an end of the preliminary combustion.

According to another aspect of the invention, a combustion control process for an internal combustion engine provided with an exhaust purifier in an exhaust passage of the internal combustion engine, comprises: a process element of controlling fuel injection to produce preliminary combustion in an engine cycle; and a process element of controlling fuel injection to start main combustion after an end of the preliminary combustion in the engine cycle.

The other objects and features of this invention will become understood from the following description with reference to the accompanying drawings.

MODE(S) FOR CARRYING OUT THE INVENTION

Figure 1:
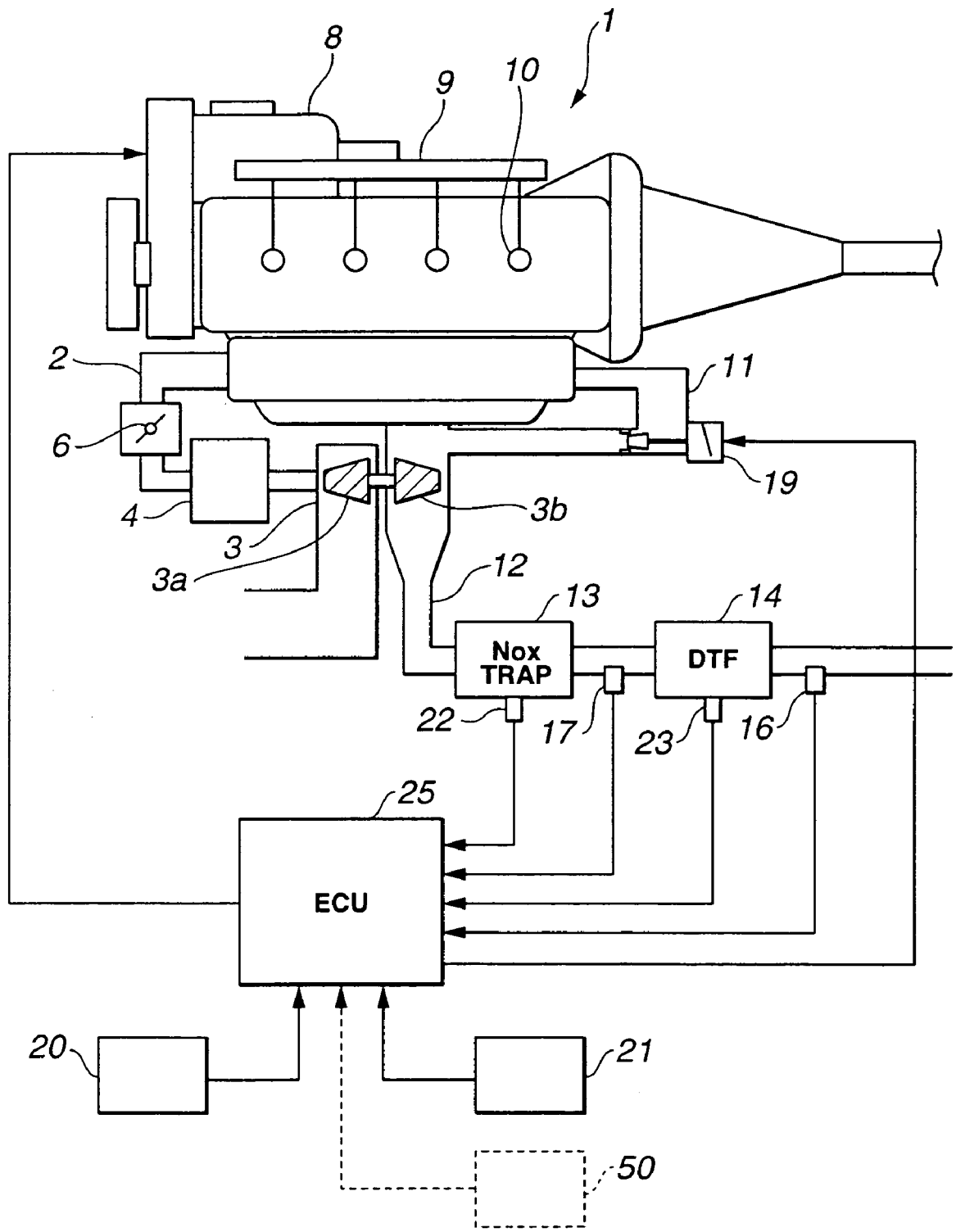
FIG. 1 is a schematic view of a combustion control system or apparatus for an internal combustion engine according to one embodiment of the present invention.

FIG. 1 shows a combustion control system or apparatus for an internal combustion engine 1. In this example, the internal combustion engine is a diesel engine.

An intake system of engine 1 includes an air compressor 3a of a turbocharger (supercharger) 3 disposed in an upstream portion of an intake passage 2, for compressing intake air for supercharging; an intercooler 4 for cooling the pressurized air from compressor 3a; and a throttle valve 6 for regulating the flow of the cooled air from intercooler 4. After passing through throttle valve 6, the intake air flows into the combustion chamber of each cylinder of engine 1 through a collector section of an intake manifold.

A fuel system includes a common rail fuel injection system including a high-pressure fuel pump 8, and a common rail 9 for receiving high-pressure fuel from fuel pump 8, and supplying the fuel to each of injectors 10. Each injector 10 is arranged to inject fuel directly into the combustion chamber of the corresponding engine cylinder. In the combustion chamber, fuel injected by the injector 10 and air inducted from the intake system are ignited by compression ignition, and burned. Exhaust gas is discharged into an exhaust passage 12.

Part of the exhaust gas mixture is recirculated as EGR gas from exhaust passage 12 to the intake side by an EGR passage 11 via an EGR valve 19. The remaining part of the exhaust gas mixture passes through an exhaust turbine 3b of turbocharger 3 of variable nozzle type, and drives exhaust turbine 3b.

An exhaust purifying device or purifier is disposed in exhaust passage 12 at a position downstream of exhaust turbine 3a. In this example, the exhaust purifying device includes an NOx trap catalyst (device) 13 and a diesel particulate filter (DPF) 14.

This NOx trap catalyst 13 traps NOx in the incoming exhaust gas when the exhaust air-fuel ratio is lean (oxygen excess state). When the exhaust air-fuel ratio is rich (fuel excess state), NOx trap catalyst 13 releases and purges the trapped NOx. NOx trap catalyst 13 contains oxidation catalyst such as Pt or other noble metal, for oxidizing incoming exhaust components (HC, CO).

DPF 14 has a PM trap function of collecting exhaust particulate matter (PM) in the exhaust gas. Moreover, this DPF 14 is provided with oxidation catalyst (noble metal) for oxidizing the incoming exhaust components (HC, CO).

In the example of FIG. 1, DPF 14 is located downstream of NOx trap catalyst 13. However, DPF 14 may be positioned upstream of NOx trap catalyst 13. Moreover, NOx trap catalyst 13 and DPF 14 can be formed as a single unit in which NOx trap catalyst 13 is carried in DPF 14.

The combustion control system further includes a sensor section or input section including various sensors for collecting information on operating conditions needed for the combustion control. A crank angle sensor (rotational speed sensor) 20 is a device for sensing an engine rotational speed Ne of engine 1. An accelerator opening sensor 21 is a device for sensing an accelerator opening APO of an accelerator of the vehicle.

The sensor section further includes a catalyst temperature sensor 22 for sensing the temperature (catalyst temperature) of NOx trap catalyst 13; an exhaust pressure sensor 17 for sensing the exhaust pressure on the entrance side of DPF 14 in exhaust passage 12; a DPF temperature sensor 23 for sensing the temperature (DPF temperature) of DPF 14; and an air-fuel ratio sensor 16 disposed on the exist side of DPF in exhaust passage 12, for sensing the exhaust air-fuel ratio (or exhaust lambda $\lambda$, expressed as numeric value of excess air ratio). Instead of sensing the temperature of NOx trap catalyst 13 directly, it is possible to determine the temperature indirectly from an exhaust gas temperature by using a temperature sensor disposed on the downstream side of NOx trap catalyst 13. Similarly, it is possible to determine the temperature of DPF 14 indirectly from an exhaust gas temperature by using a temperature sensor disposed on the downstream side of DPF 14.

The combustion control system further includes a control section or controller including a control unit or ECU 25 for controlling engine 1 in accordance with the information collected by the sensor section. Signals from the sensors are supplied to ECU 25. On the basis of these input signals, ECU 25 outputs a fuel injection command signal to each of fuel injectors 10, a throttle opening command signal to throttle valve 6 and an opening command signal to EGR valve 19. Specifically, by producing the fuel injection command signal to control the fuel injection quantity and fuel injection timing, ECU 25 commands each injector 10 to perform a main injection and at least one preliminary injection prior to the main injection. Furthermore, ECU 25 controls throttle valve 6 by producing a throttle opening command signal, and controls EGR valve 19 by producing an EGR opening command signal.

ECU 25 carries out exhaust purification control for purge of PM trapped and deposited in DPF 14 (DPF regeneration), purge of NOx trapped by NOx trap catalyst 13 (NOx regeneration) and purge of SOx deposited in NOx trap catalyst 13 because of its exposure to SOx (SOx regeneration), in the flowing manner.

For the control to restore the purification capability of 20 NOx trap catalyst 13 or DPF 14, ECU 25 changes the operating conditions of engine 1. When, for example, a request for rich operation in a rich region equal to or less than a stoichiometric ratio (theoretical air-fuel ratio: $\lambda=1$) is made, ECU 25 decreases the intake air quantity of air supplied to engine 1 by decreasing the opening of throttle valve 6; or ECU 25 increases the fuel injection quantity by controlling fuel pump 8.

For regeneration of DPF 14, ECU 25 of this example controls the target air-fuel ratio $\lambda$ between 1 to 1.4 ($1 \leq \lambda \leq 1.4$), and controls the temperature of DPF 14 at 600° C. or higher (DPF temperature $\geq$ 600° C.).

In a normal operation region under lean conditions, pilot injection is usually carried out to alleviate abrupt combustion at an early stage before main injection. The fuel injection timing of this pilot injection is 40 to 10° BTDC (crank angle timing before top dead center), and the fuel injection quantity of pilot injection is 1 to 3 mm³/st. The timing of the main injection is approximately 10 to −20° BTDC. The interval between the pilot injection and the main injection is set to approximately 10 to 30° CA (crank angle).

To realize a low air-fuel ratio and a high exhaust temperature for regeneration of DPF 14 and sulfur poisoning recovery or cancellation, the control system decreases the intake air quantity from the level in the normal operation. However, a decrease in the intake air quantity causes a decrease in a compression end temperature which is the temperature inside the cylinder at or near an end of compression stroke or at or near a top dead center of compression stroke, and hence the combustion tends to become unstable. Therefore, the injection timing of the main injection is advanced when pilot injection is performed in setting similar to that of normal lean operation, as shown in a first example I (comparative example) of FIG. 13.

With such setting of fuel injection quantity and injection timing, retardation of the injection timing to raise the exhaust temperature renders the combustion unstable, so that the amount of retard is limited. For example, it is difficult to realize an operation for sulfur poisoning cancellation or desulfurization, in a λ range equal to or less than 1 ($\lambda \leq 1$) and in an exhaust temperature range equal to or higher than 600° C. (exhaust temperature $\geq 600°$ C.).

Figure 14:
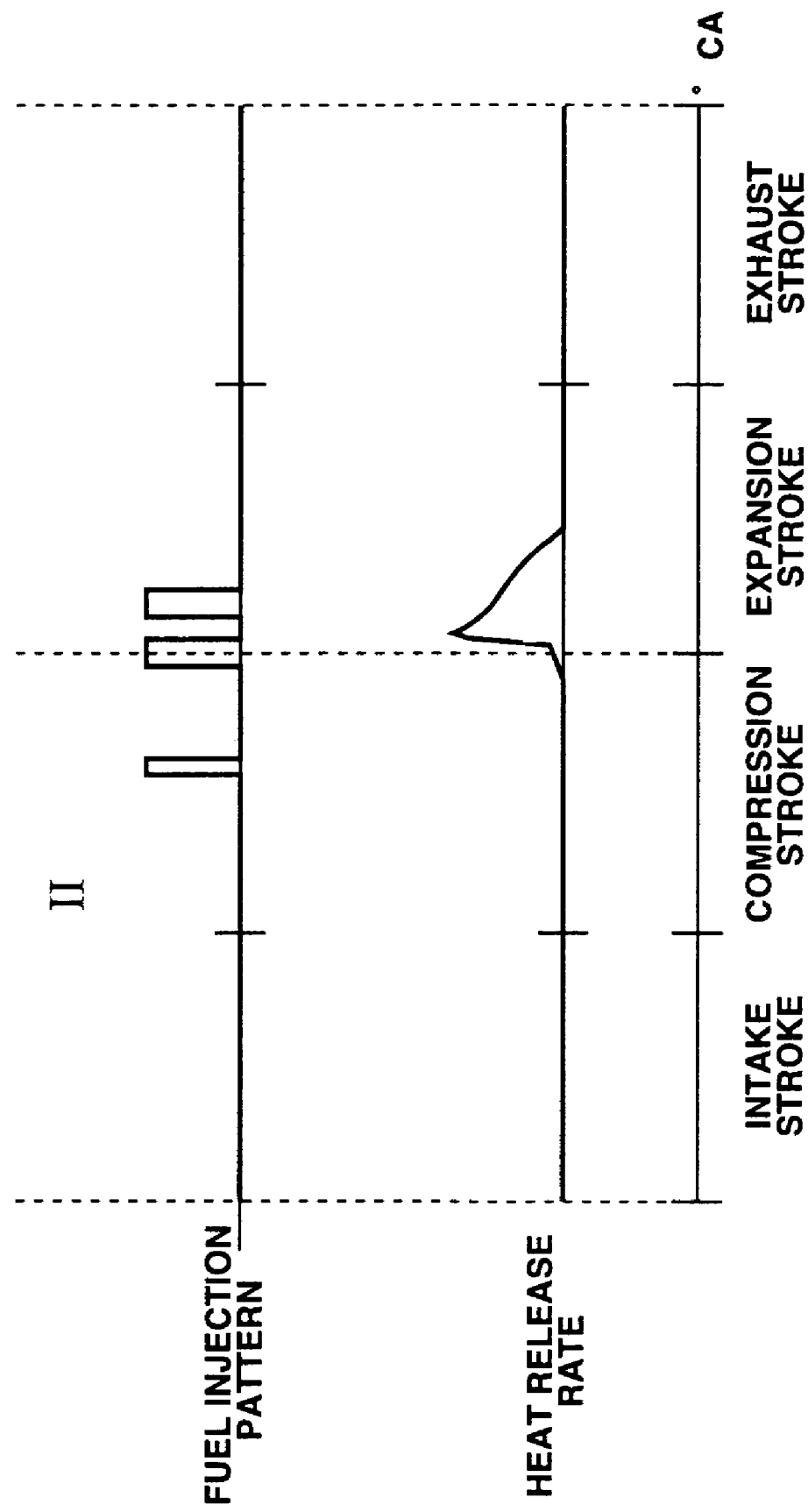
FIG. 14 is a view showing a combustion control mode of a second example.

FIG. 14 shows a second example II as disclosed in EP1035315 A2 (corresponding to JP2000-320386 A). In this example, the range of retard of the fuel injection timing is expanded by a plurality of split main injections, to realize a high exhaust temperature and a low air-fuel ratio.

In the second example II shown in FIG. 14, however, fuel injected by a plurality of main injections is burned continuously. Fuel of a subsequent injection is injected in the state where combustion of fuel of a previous injection is still active. Therefore, the combustion is continuous as shown in FIG. 14. Fuel of a subsequent injection is injected into flames in combustion of fuel injected by a previous injection, and combustion starts immediately in the flames. Therefore, the combustion mode of the example II increases the percentage of diffusive combustion and makes the equivalence ratio very rich partially, resulting in considerable deterioration of smoke emission level.

Figure 15:
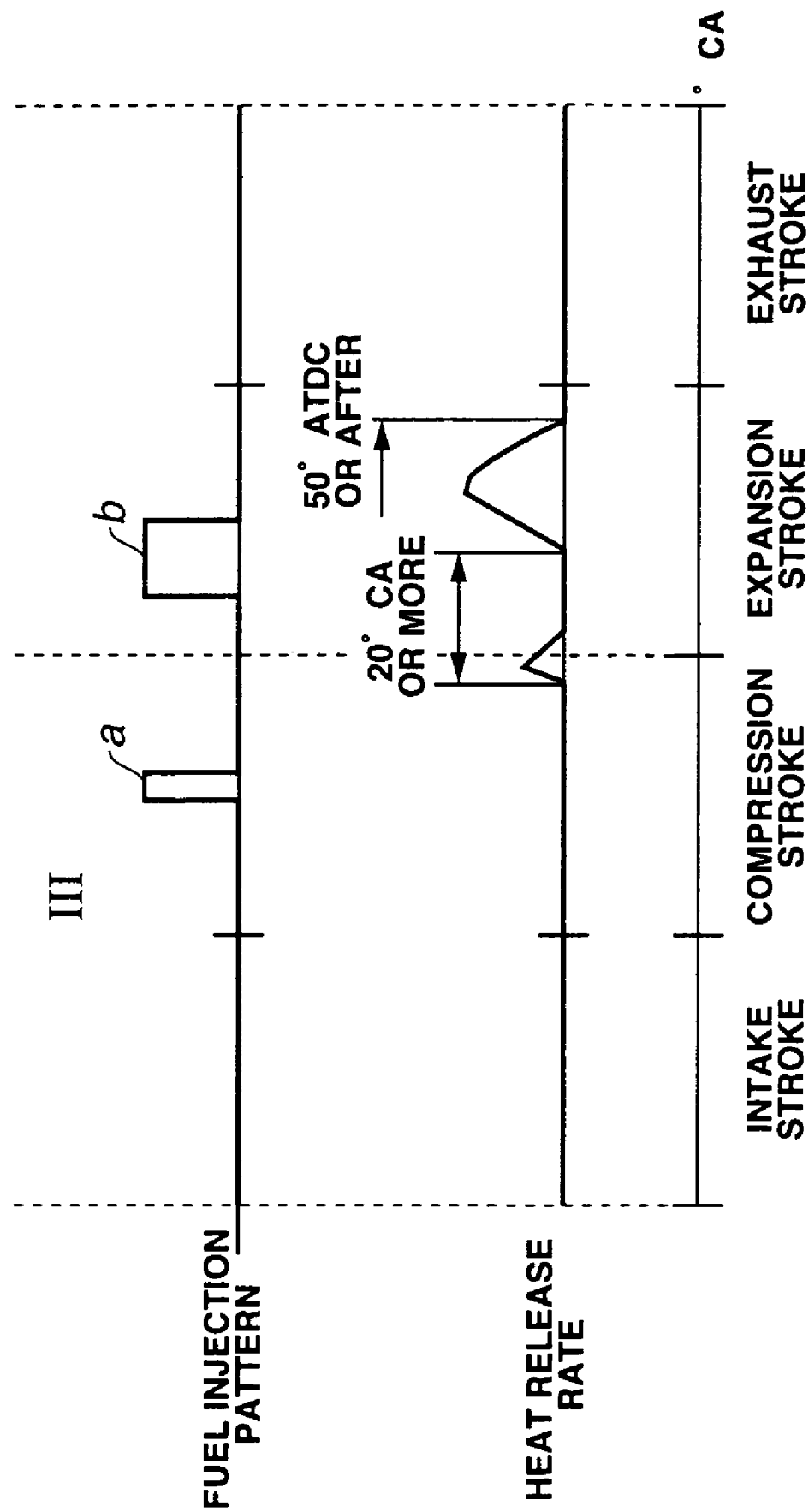
FIG. 15 is a view showing a combustion control mode of a third example (split retard combustion mode) according to one embodiment of the present invention.

In view of this, the combustion control system according to the embodiment changes over the operation from the normal lean combustion mode to a split combustion mode or split retard combustion mode as shown, as an third example III, in FIG. 15, to regain the exhaust purification function of the exhaust purifying device (NOx trap catalyst 13 and DPF 14).

The combustion control system according to this embodiment carries out the split retard combustion control mode by controlling preliminary combustion occurring at or near compression top dead center by fuel injection before compression top dead center, and main combustion occurring after an end of the preliminary combustion, for producing main torque.

In the split combustion mode, as shown in FIG. 15, the combustion control system first performs a preliminary fuel injection (indicated by "a" in FIG. 15) on the compression stroke, and thereby raises the incylinder temperature in the cylinder at or near compression top dead center (TDC). Though the fuel injection quantity for heat generation of the preliminary combustion differs depending on the operating conditions, fuel is injected, by the preliminary injection, at least in an amount required to confirm heat generation of the preliminary combustion. Thus, by raising the incylinder temperature by a heat releasing process of the preliminary combustion, the combustion control system according to this embodiment can broaden the possible range of retard of the main combustion by shifting the retard limit.

It is optional to carry out a plurality of preliminary combustion processes within one cycle. In this case, fuel injection is so controlled that at least one preliminary combustion process occurs at or near compression top dead center.

Moreover, it is optional to adjust at least one of the fuel injection quantity and the fuel injection timing for the preliminary combustion in accordance with the compression end temperature (that is, the incylinder temperature at or near compression top dead center). The compression end temperature is estimated from one or more engine operating conditions of engine 1 (such as engine rotational speed Ne, and fuel injection quantity Q). In this case, too, the fuel injection quantity is set to a quantity to enable confirmation of heat generation of the preliminary combustion, and at least one preliminary combustion process takes place at or near compression top dead center. The combustion is a heat releasing process, and the preliminary combustion ends when the heat releasing process ends, so that the end of the preliminary combustion is the end of the heat releasing process.

In this example, the fuel injection quantity for the preliminary combustion is set equal to a quantity required to make the incylinder temperature at the time of fuel injection for the main combustion higher than an auto-ignition temperature enabling auto ignition in the cylinder The main combustion is initiated after the preliminary combustion is finished. Fuel is injected for the main combustion after the end of the preliminary combustion, and at least part of the injected fuel is burned in the premixed combustion mode. As shown in FIG. 15, a main fuel injection (indicated by "b" in FIG. 15) for the main combustion is carried out after top dead center so that the main combustion starts after the end of the preliminary combustion.

The combustion control system of this example control the fuel injection timing for the main combustion in accordance with the engine operating conditions (particularly the engine speed Ne) so that the combustion start timing of the main combustion is retarded from the combustion start timing of the preliminary combustion, by an amount equal to or greater than 20 degrees in terms of crank angle (CA), as shown in FIG. 15. Thus, by setting the amount of retard of 20° CA or more between the start of the preliminary combustion and the start of the main combustion, this combustion control system can broaden the range of retard of the main combustion by raising the incylinder temperature by the preliminary combustion, and carry out the main fuel injection for the main combustion reliably after the end of the preliminary combustion. Therefore, this combustion control system can reduce the smoke emissions by securing a period of ignition delay for the main combustion, and increasing the percentage of premixed combustion in the main combustion.

Moreover, the combustion end timing of the main combustion is set at 50 degrees or more in crank angle after top dead center, as shown in FIG. 15. By controlling the fuel injection timing to time the main combustion to end at or after 50° ATDC, the combustion control system can control the exhaust gas temperature in accordance with the operating state of engine 1.

Moreover, the combustion control system of this example controls the fuel injection quantity, injection timing and fuel injection period for the main combustion so that the torque produced by engine 1 is held constant.

In this split retard combustion mode, the control system according to the embodiment can improve the controllability to a target temperature by shifting the retard limit in the retard direction with the preliminary combustion, and reduce the emissions of smoke with premixed combustion by starting the main combustion after the heat releasing process of the preliminary combustion is finished.

Figure 13:
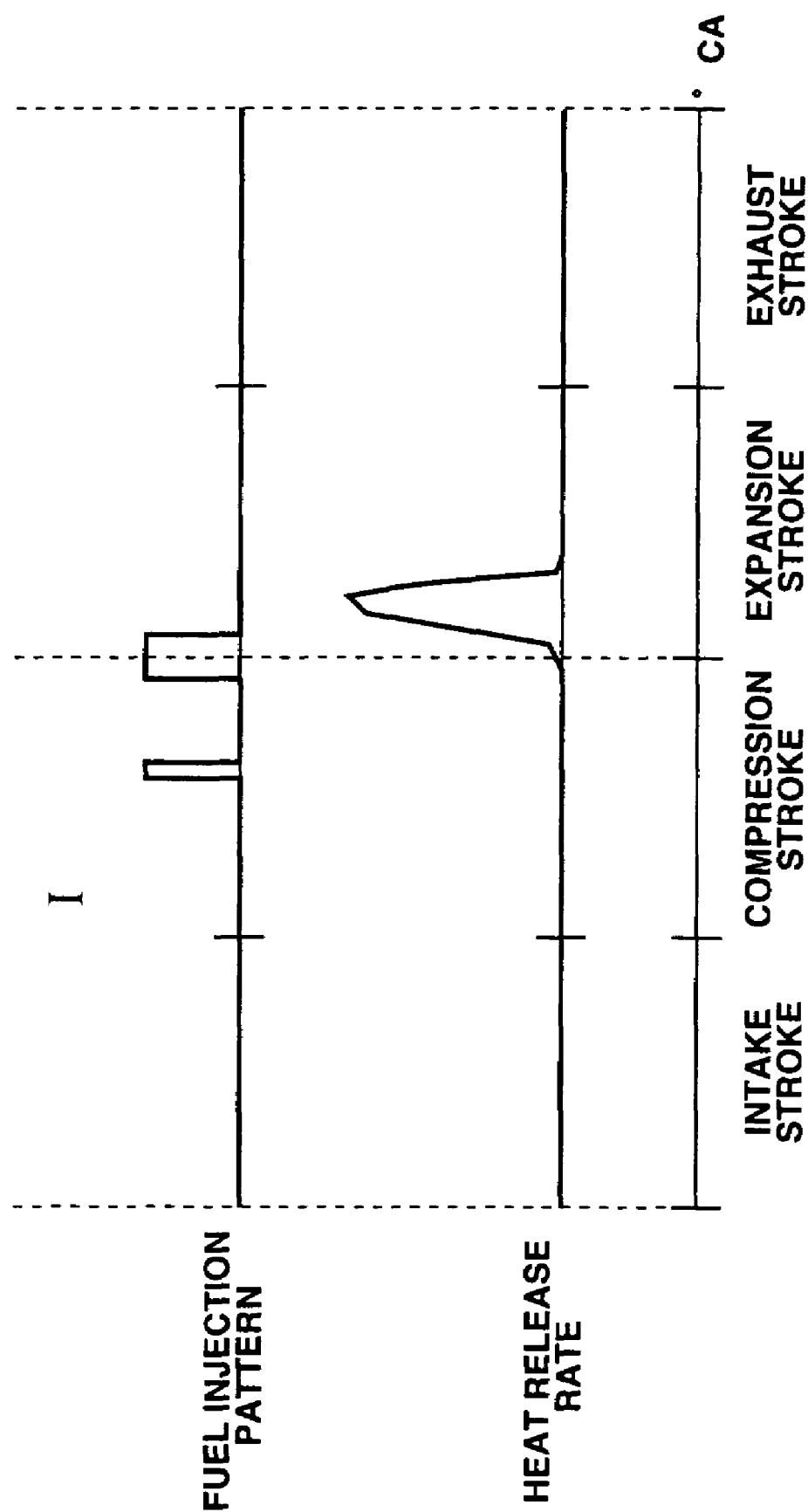
FIG. 13 is a view showing a combustion control mode of a first example.
Figure 17:
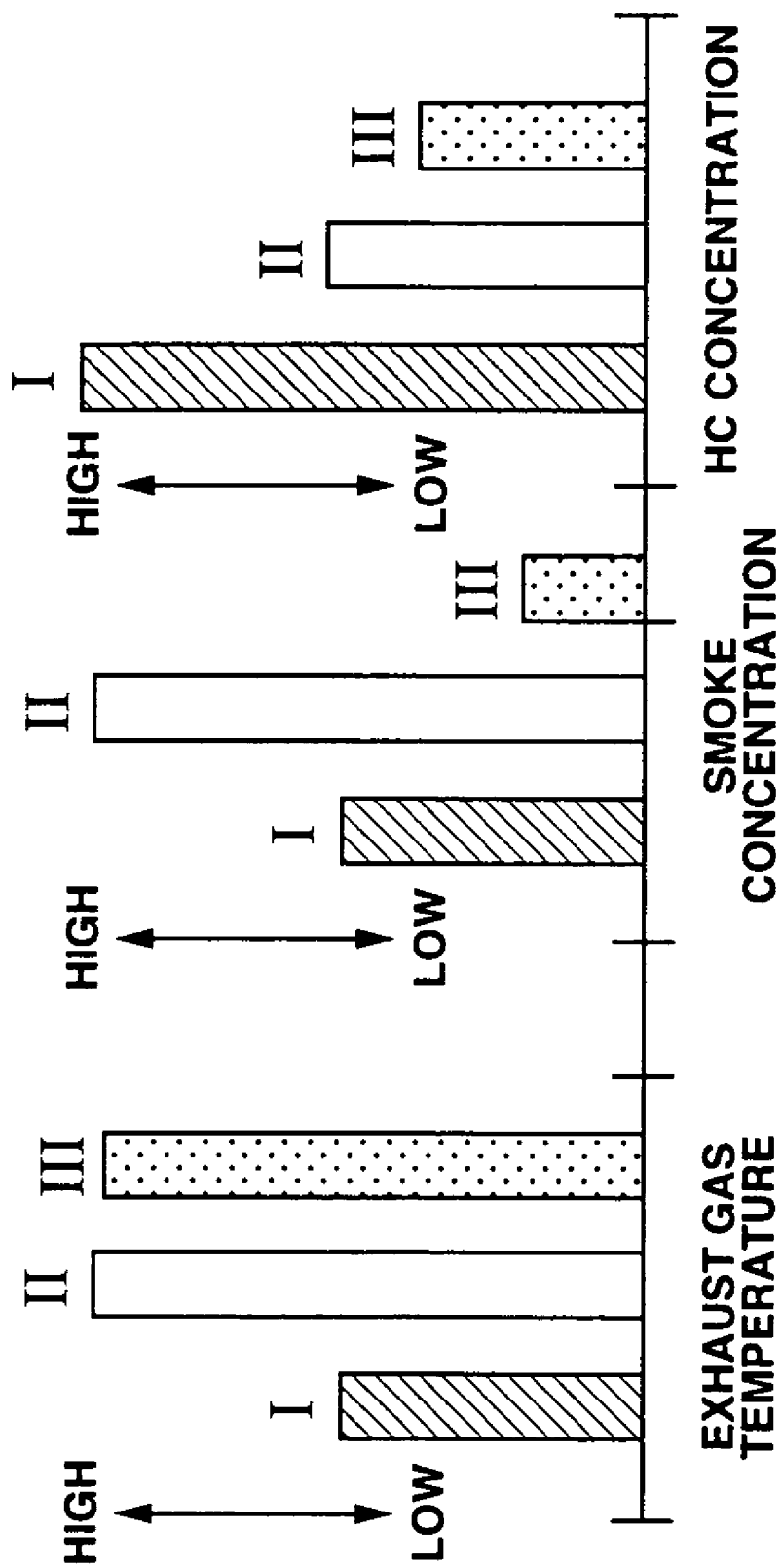
FIG. 17 is a view showing conditions of exhaust gas mixture in the third example of FIG. 15, in comparison with the first and second examples of FIG. 13 and FIG. 14.
Figure 18A:
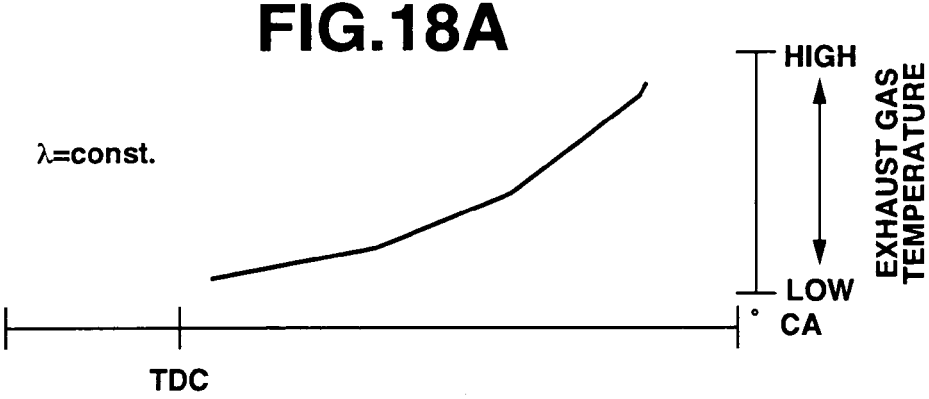
FIGS. 18A-18D are views showing the exhaust gas conditions with respect to the timing of the main combustion in the split retard combustion mode.
Figure 18B:
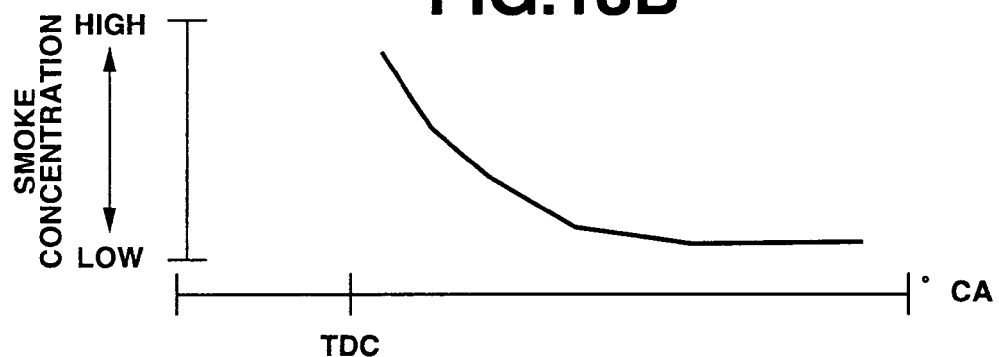
Figure 18C:
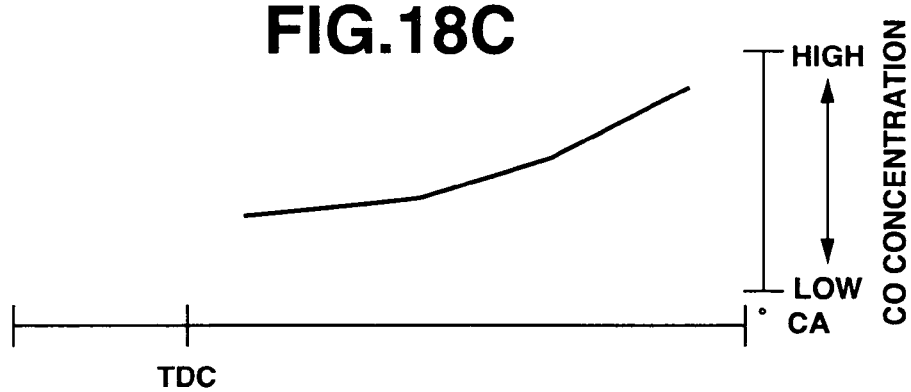
Figure 18D:
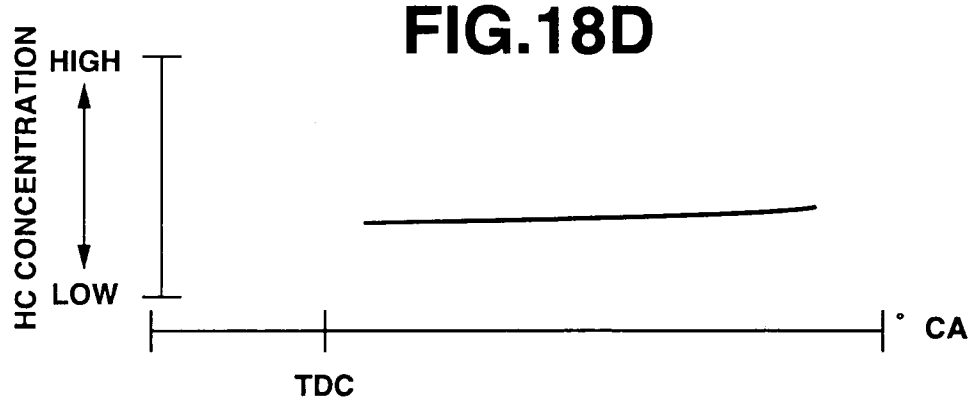

FIG. 17 shows effects in exhaust gas temperature, smoke concentration and HC (hydrocarbon) concentration, of the split retard combustion mode of the third example III shown in FIG. 15 in comparison with the first and second examples I and II shown in FIGS. 13 and 14.

By the split retard combustion mode as indicated by III in FIG. 17, the combustion control system can achieve a high exhaust gas temperature and a low smoke emission level simultaneously by realizing a rich condition. Moreover, the combustion control system can reduce the HC concentration significantly as compared to an enriched operation in the first example I and to a continuous burning operation in the second example II.

Since the temperature in the cylinder is raised by the preliminary combustion and the range of retard of the main combustion is broadened, the combustion at a low air-fuel ratio is stable and the exhaust gas temperature is high even if the injection timing of the main injection is retarded Graphs of FIGS. 18A, 18B, 18C and 18D show variation in the temperature, smoke concentration, CO (carbon monoxide) concentration and HC concentration of the exhaust gas with respect to the timing of the main combustion in the split retard combustion mode. In this example, the exhaust air-fuel ratio is constant ($\lambda$=const). As shown in these graphs, as the amount of retard of the main combustion increases, the smoke emission is reduced even at a low exhaust air-fuel ratio because of an increase in the proportion of premixed combustion.

Figure 19:
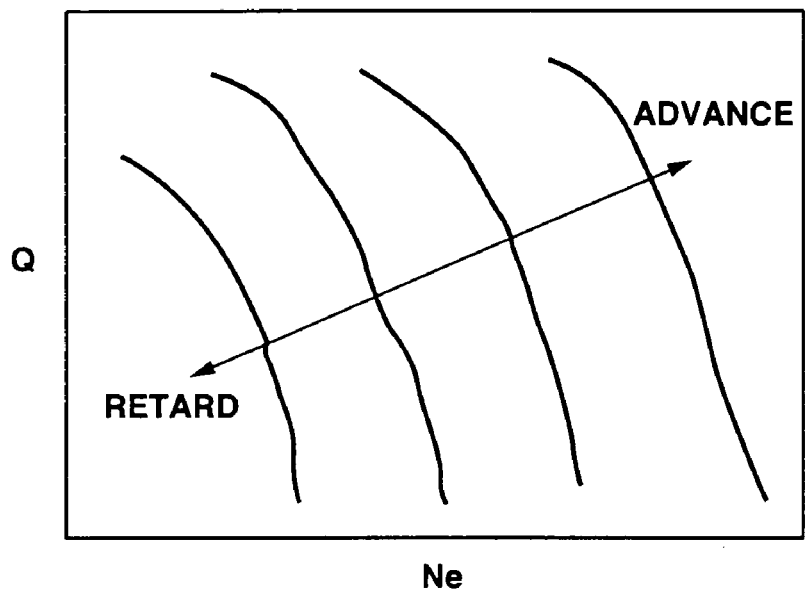
FIG. 19 is a view showing a target fuel injection timing for main combustion according to this embodiment of the present invention.

FIG. 19 shows a characteristic of a target fuel injection timing for the main combustion in the split retard combustion mode according to this embodiment. The horizontal axis represents engine rotational speed Ne and the vertical axis represents engine load Q. As shown in FIG. 19, when load Q is low, the combustion timing of the main combustion for achieving the target exhaust gas temperature is largely retarded. Therefore, in some cases, it is difficult to hold the incylinder temperature high enough until the injection timing of the main combustion, by only one preliminary combustion process. In such case, by carrying out a plurality of preliminary combustion processes so that heat releasing processes do not overlap one another, as shown in FIG. 16 (example IV), the combustion control system can achieve both the target of low smoke emissions and the target of high exhaust gas temperature even under low-load conditions.

Figure 16:
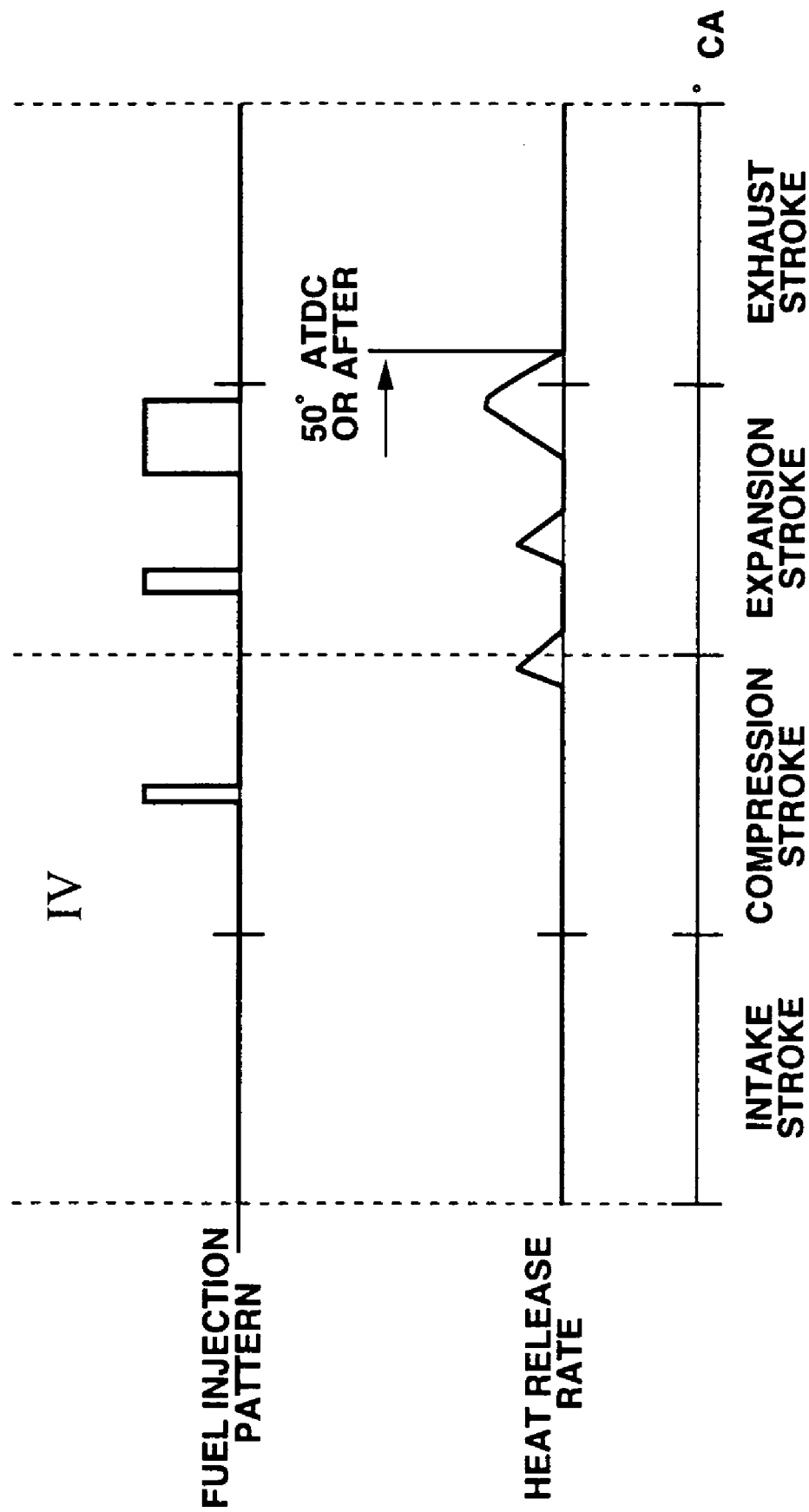
FIG. 16 is a view showing a combustion control mode of a fourth example (split retard combustion mode) according to the embodiment of the present invention.

Thus, the combustion control system according to this embodiment of the present invention changes over the combustion control mode from the normal mode (of lean operation) to the split retard combustion mode with preliminary combustion and main combustion (as shown in FIGS. 15 and 16) when a request for increasing the exhaust gas temperature or a request for rich operation in a range equal to or less than the stoichiometry is produced in accordance with one or more conditions of the exhaust purifying device (13, 14), and thereby carries out regeneration of NOx trap catalyst 13 or DPF 14 in the state of a high exhaust temperature and a low air-fuel ratio.

FIGS. 2~12 show a combustion control process performed by the combustion control system of FIG. 1.

Figure 2:
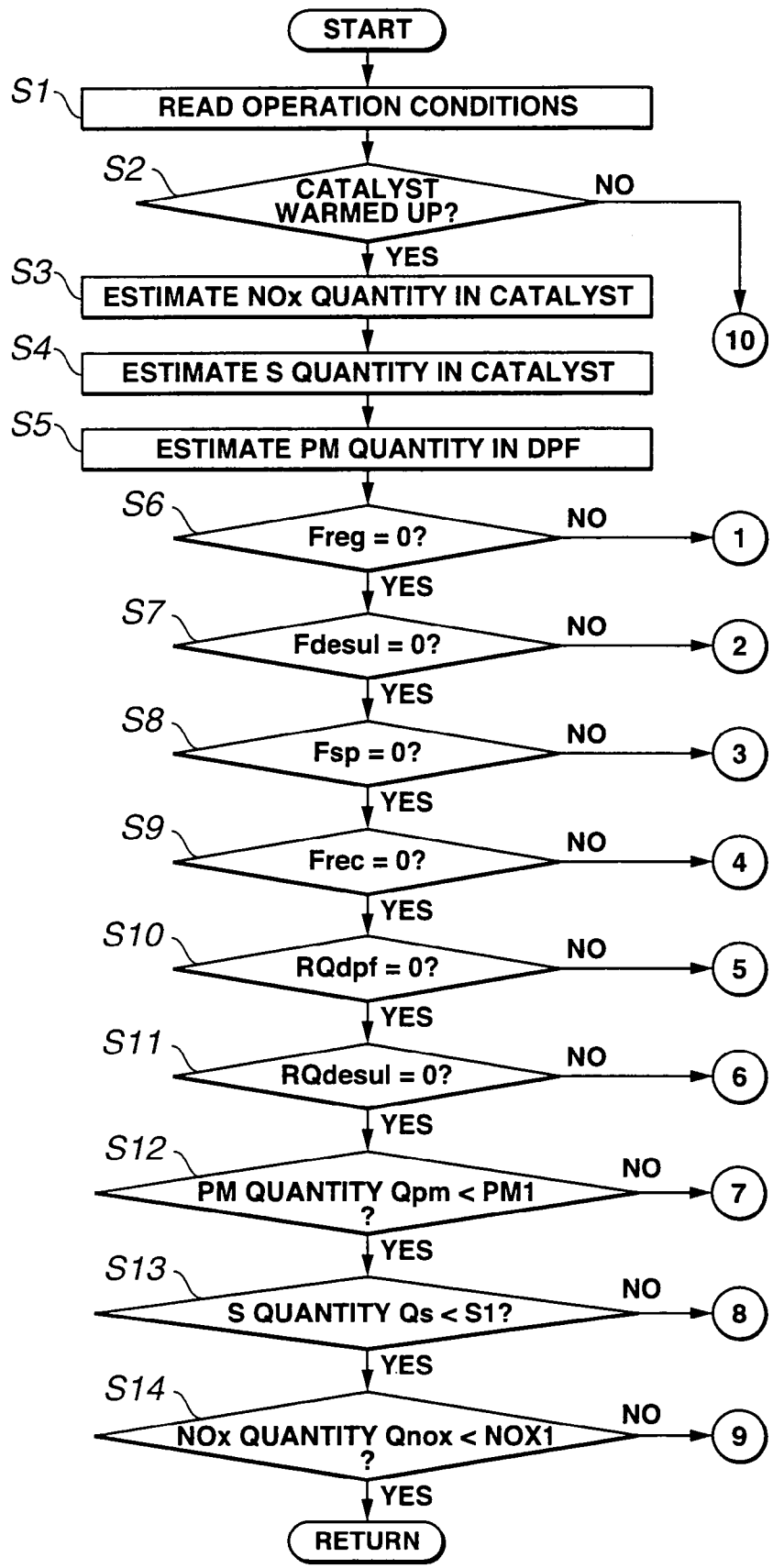
FIG. 2 is a flowchart showing a main combustion control process performed by the combustion control system of FIG. 1.

FIG. 2 shows a main routine of the combustion control.

At step S1, ECU 25 ascertains operating conditions including the engine rotational speed Ne, accelerator opening APO, catalyst temperature, exhaust pressure on the entrance side or exit side of DPF 14, and DPF temperature which are calculated from the signals from the sensors; and reads the fuel injection quantity (main injection quantity) Q which is calculated from a map using the engine rotational speed Ne and accelerator opening APO as parameters.

At step S2, ECU 25 examines whether or not NOx trap catalyst 13 in exhaust passage 12 is in a warm-up state (activated state). In this example, ECU 25 compares the exhaust temperature T calculated from the output signal of exhaust temperature sensor 15 at the exit of NOx trap catalyst 13, with a predetermined exhaust temperature T5 which is a predetermined exhaust temperature at the start of activation of NOx trap catalyst 13. ECU 25 judges that NOx trap catalyst 13 is warmed up when exhaust temperature T is higher than the predetermined temperature (T>T5).

When this exhaust temperature T is higher than the predetermined exhaust temperature T5 (T>T5), ECU 25 proceeds to step S3 on the assumption that NOx trap catalyst 13 is warmed up.

Figure 12:
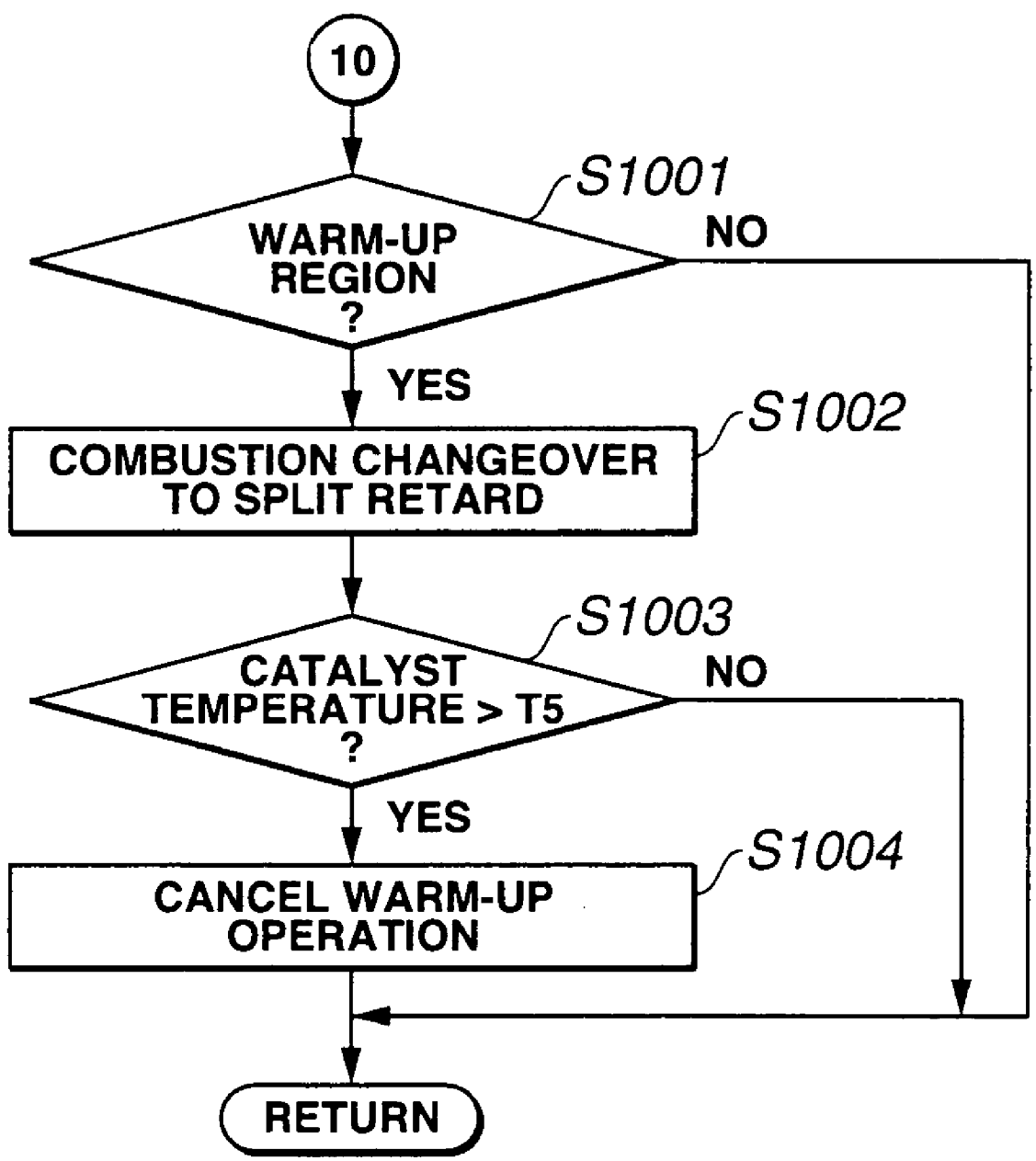
FIG. 12 is a flowchart of an NOx trap catalyst warming up process for warming up the NOx trap catalyst.

When, on the other hand, the exhaust temperature T is equal to or lower than the predetermined exhaust temperature T5 (T$\leq$T5), ECU 25 considers that NOx trap catalyst 13 is cold, and proceeds to step S1001 shown in FIG. 12. Thus, when NOx trap catalyst 13 is cold, this combustion control system enters the routine of FIG. 12, and changes over the combustion mode from the normal mode to the split retard combustion mode to warm up NOx trap catalyst 13 quickly, as explained later.

At step S3, ECU 25 calculates an NOx trap or accumulation quantity Qnox that is the quantity of NOx 30 trapped and accumulated in NOx trap catalyst 13. A U.S. Pat. No. 5,473,887 (corresponding to Japanese Patent No. 2,600,492) shows a method for calculating an NOx absorption quantity by estimation from a cumulative value of engine speed Ne. It is possible to employ this calculation method, and the explanations on the calculation of NOx absorption or accumulation quantity in this U.S. patent are incorporated by reference. Alternatively, it is possible to employ a calculation method of calculating an NOx accumulation quantity by adding an increase quantity of the NOx accumulation quantity each time a predetermined distance is traveled by the vehicle. In this case, the combustion control system can utilize a sensor 50 for determining the distance traveled by the vehicle. In a method using an accumulated or cumulative quantity by summation, the accumulated quantity is reset at the time when NOx regeneration is completed (including the time when NOx regeneration is simultaneously carried out with SOx regeneration in an operation for SOx regeneration).

At step S4, ECU 25 calculates a sulfur content accumulation quantity (S quantity) Qs of sulfur content (SOx) accumulated in NOx trap catalyst 13. It is possible to calculate the sulfur content accumulation quantity by estimation from the accumulated or cumulative quantity of the engine rotational speed Ne or from the travel distance of the vehicle as in the above-described calculation of the quantity of accumulated NOx. In the case of using the accumulated or integrated quantity, the accumulated quantity is reset at the time when the regeneration is completed.

At step S5, ECU 25 determines a PM accumulation quantity Qpm of PM trapped and accumulated in DPF 14. In this example, ECU 25 calculates the PM accumulation quantity by sensing the exhaust pressure on the entrance side of DPF 14 with exhaust pressure sensor 17 and then comparing the sensed exhaust pressure with a reference exhaust pressure in the present operating state (determined by engine rotational speed Ne, and fuel injection quantity Q). This is because the exhaust pressure on the entrance side of DPF 14 naturally rises when the quantity of PM accumulated in DPF 14 increases. It is optional to calculate the PM accumulation quantity by estimation from one or more of the travel distance of the vehicle after the previous DPF regeneration, the accumulated value of the engine rotational speed Ne after the previous DPF regeneration, and the exhaust pressure.

At step S6, ECU 25 determines whether or not a reg flag Freg is set. Reg flag Freg is a condition code indicating whether DPF 14 is in a regeneration mode or not. If DPF 14 is not in the regeneration mode (Freg=0), ECU 25 proceeds to step S7. On the other hand, if DPF 14 is in the regeneration mode (Freg=1), ECU 25 performs operations in a DPF regeneration mode of step 101 and the subsequent steps in FIG. 3, as mentioned later.

At step S7, ECU 25 examines whether or not a desul flag Fdesul is set. Desul flag Fdesul is a condition code indicating whether NOx trap catalyst 13 is in a sulfur poisoning recovering mode (SOx regeneration mode). If NOx trap catalyst 13 is not in the sulfur poisoning recovering mode (Fdesul=0), ECU 25 proceeds from S7 to step S8. On the other hand, if NOx trap catalyst 13 is in the sulfur poisoning recovering mode (Fdesul=1), ECU 25 performs operations in a rich combustion mode of step S201 and the subsequent steps in FIG. 4, as mentioned later.

At step S8, ECU 25 examines whether or not an sp flag Fsp is set. This sp flag Fsp is a condition code indicating whether NOx trap catalyst 13 is in a rich spike mode for regeneration of NOx trap catalyst 13. If NOx trap catalyst 13 is not in the rich spike mode (Fsp=0), ECU 25 proceeds from S8 to step S9. On the other hand, if NOx trap catalyst 13 is in the rich spike mode (Fsp=1), ECU 25 performs operations in the rich spike mode (NOx regeneration mode) of step S301 and the subsequent steps in FIG. 5, as mentioned later.

At step S9, ECU 25 examines whether or not a rec flag Frec is set. This rec flag Frec is a condition code indicating whether DPF 14 is in a melting prevention mode after the DPF regeneration mode or the sulfur poisoning recovery. If the rec flag is not set (Frec=0), ECU 25 proceeds to step S10. On the other hand, if the rec flag is set (Frec=1), ECU 25 performs operations in the melting prevention mode of step S401 and the subsequent steps in FIG. 6, as mentioned later.

At step S10, ECU 25 examines whether or not a rq_DPF flag RQdpf is set. The rq_DPF flag RQdpf is a condition code indicating whether a regeneration request is issued for DPF 14. If the DPF regeneration request is not issued (RQdpf=0), ECU 25 proceeds to step S11. On the other hand, if the DPF regeneration request is issued (RQdpf=1), ECU 25 performs operations to determine the priority in regeneration in the case where the DPF regeneration request is issued, at step S501 and the subsequent steps in FIG. 7, as mentioned later.

At step S11, ECU 25 examines whether or not a rq_desul flag RQdesul is set. This rq_desul flag RQdesul is a condition code indicating whether a request for the sulfur poisoning recovering (SOx regeneration request) is issued for NOx trap catalyst 13. If the sulfur poisoning recovery request is not issued (RQdesul=0), ECU 25 proceeds to step S12. On the other hand, if the sulfur poisoning recovery request is issued (RQdesul=1), ECU 25 performs operations to determine the priority in regeneration in the case where the sulfur poisoning recovering request is issued, at step 601 and the subsequent steps in FIG. 8, as mentioned later.

Figure 20:
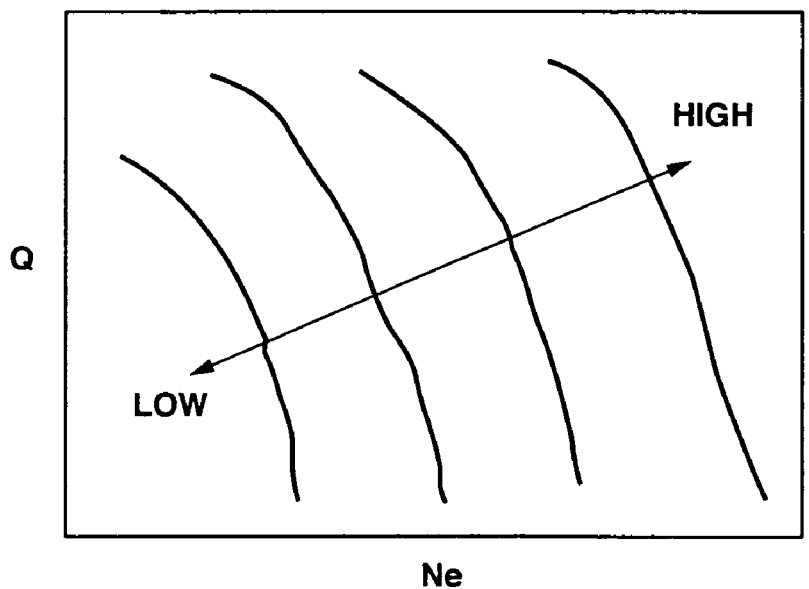
FIG. 20 is a view showing an exhaust pressure threshold value of DPF.

At step S12, ECU 25 examines whether or not the PM accumulation quantity Qpm calculated at step S4 becomes equal to or greater than a predetermined quantity PM1 indicating the need for regeneration of DPF 14 (Qpm<PM1), that is, whether DPF regeneration timing is reached. Instead, it is possible to determine the DPF regeneration timing in accordance with the exhaust gas pressure on the DPF entrance side, by using a map shown in FIG. 20, for example. In this case, the exhaust gas pressure on the DPF entrance side at the time when the quantity of deposited PM in DPF 14 reaches the predetermined quantity PM1 is determined for each operating state (determined by engine rotational speed Ne, and fuel injection quantity Q) and mapped as shown in FIG. 20. Thus, ECU 25 judges that the DPF regeneration timing (Qpm≧PM1) is reached when the exhaust pressure on the DPF entrance side detected by exhaust pressure sensor 17 reaches a threshold value of exhaust pressure corresponding to the present operating state (engine rotational speed Ne, and fuel injection quantity Q) in the map of FIG. 20.

If it is not the DPF regeneration timing (Qpm<PM1), ECU 25 proceeds from S12 to step S13. On the other hand, if it is determined that the DPF regeneration timing is reached (Qpm≧PM1), ECU 25 proceeds from S12 to a step S701 in FIG. 9 and sets the rq_DPF flag RQdpf to one to issue a DPF regeneration request. Thus, when the quantity of PM accumulated in DPF 14 amounts to the predetermined quantity PM1, this combustion control system changes over the combustion mode from the normal operation mode (lean operation) to the combustion mode to raise the exhaust gas temperature to a temperature to cause the PM deposited in DPF 14 to auto-oxidize.

At step S13, ECU 25 examines whether or not the sulfur content accumulation quantity (quantity of SOx) Qs in NOx trap catalyst 13 calculated at step S4 becomes greater than or equal to a predetermined quantity S1, and thereby determines the regeneration timing or the need for sulfur poisoning recovery (SOx regeneration request).

If the sulfur content accumulation quantity Qs is less than predetermined quantity S1 (Qs<S1), ECU 25 considers that the sulfur poisoning recovery is not yet required, and proceeds to step S14.

Figure 10:
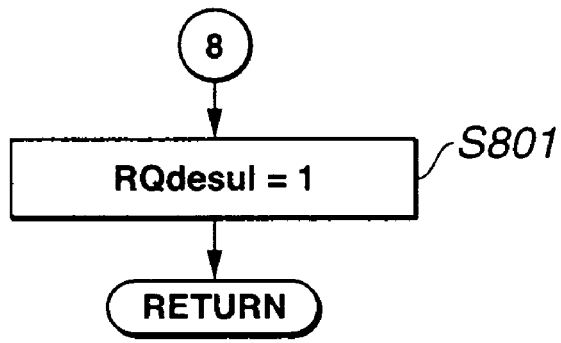
FIG. 10 is a flowchart of a sulfur poisoning recovery request flag setting process performed by the combustion control process of FIG. 1.
Figure 11:
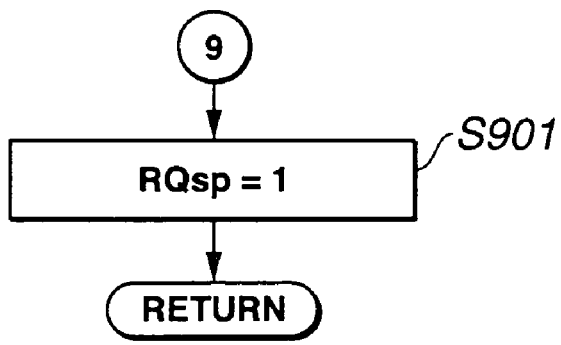
FIG. 11 is a flowchart of an NOx regeneration request flag setting process performed by the combustion control process of FIG. 1.

On the other hand, if the sulfur content accumulation quantity Qs is equal to or more than predetermined quantity S1 (Qs≧S1), ECU 25 considers that the sulfur poisoning recovery is required, proceeds to step S801 in FIG. 10 and sets the rq_desul flag RQdesul (sulfur poisoning recovery request flag) to one to issue a sulfur poisoning recovery request. Instead, it is optional to produce the sulfur poisoning recovery request when the traveling distance of the vehicle after the previous regeneration exceeds a predetermined distance and at the same time the exhaust pressure sensed by exhaust pressure sensor 17 exceeds a predetermined threshold value. Thus, for every traveling distance, the combustion control system changes over the combustion mode from the normal operating mode to the combustion mode to increase the exhaust gas temperature to a temperature that enables purge of sulfur content trapped in NOx trap catalyst 13, in a rich atmosphere.

At step S14, ECU 25 examines whether or not the NOx accumulation quantity Qnox in NOx trap catalyst 13 calculated at step S3 becomes greater than or equal to a predetermined quantity NOx1 and thereby examines whether the regeneration timing is reached, that is, whether the NOx regeneration is necessary or not.

If the NOx accumulation Qnox is less than predetermined quantity NOx1 (Qnox<NOx1), ECU 25 considers that NOx regeneration is not necessary, and terminates the process of FIG. 2.

On the other hand, if the NOx accumulation quantity Qnox is equal to or more than predetermined quantity NOx1 (Qnox≧NOx1), it is determined that NOx regeneration is necessary. At step 901 in FIG. 11, ECU 25 sets the rq_sp flag (NOx regeneration request flag) RQsp to 1 to issue an NOx regeneration request. Instead, it is optional to determine the regeneration timing in accordance with the travel distance of the vehicle and the exhaust gas pressure sensed by exhaust gas pressure sensor 17. When the travel distance after the previous regeneration exceeds a predetermined distance and the exhaust pressure exceeds a predetermined threshold value, ECU 25 produces the NOx regeneration request. Thus, each time a predetermined distance is traveled, the combustion control system changes over the combustion mode from the normal operation mode to the combustion mode to purge NOx trapped in NOx trap catalyst 13.

Figure 3:
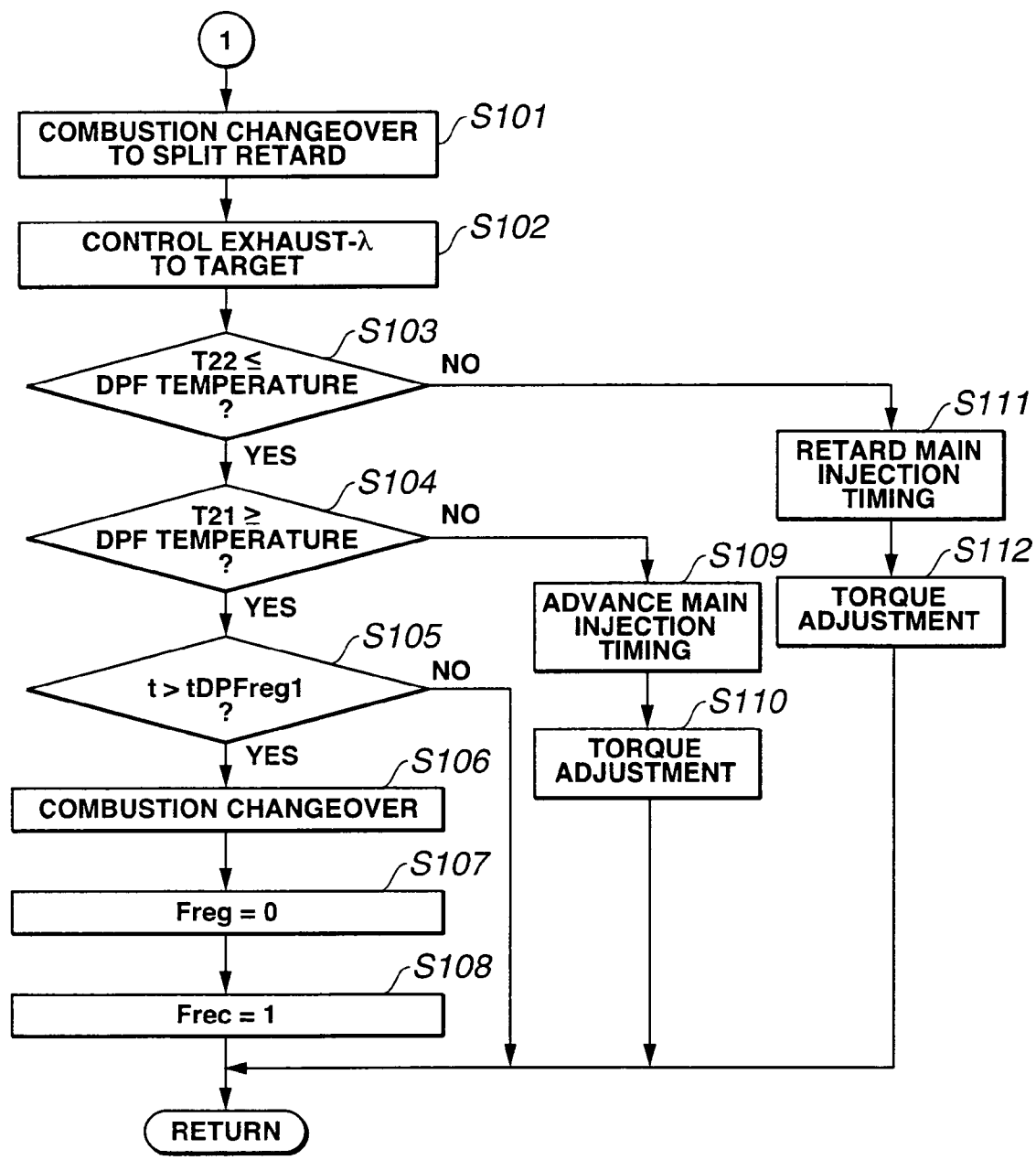
FIG. 3 is a flowchart of a DPF regeneration process perform by the combustion control system of FIG. 1 in a warmed-up state of an NOx trap catalyst.

FIG. 3 shows a DPF regeneration (melting prevention) process in the warped-up state of NOx trap catalyst 13 performed when the DPF regeneration mode flag Freg (Freg=1) is judged to be one at step S6.

At step S101, ECU 25 considers that predetermined condition is met for combustion changeover, and changes over the combustion mode from the normal lean combustion to the split retard combustion according to this embodiment. That is, when at least one of a request for an increase in the exhaust gas temperature and a request for a rich operation in a region equal to or less than the stoichiometry, is produced in accordance with a sensed or estimated condition of the exhaust purifying device (13 and/or 14), the combustion control system changes over the combustion mode from the normal lean operation to the split retard combustion mode in which a main combustion process for generating main torque and at least one preliminary combustion process prior to the main combustion.

Figure 29:
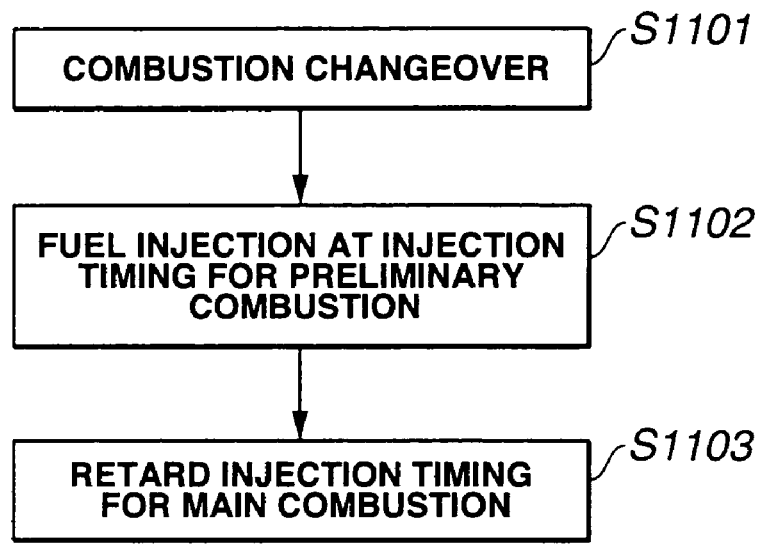
FIG. 29 is a flowchart showing a process of combustion changeover to a split retard combustion mode according to the embodiment.

When a combustion changeover command is produced, the combustion mode is changed over by the flow of steps S1101 to S1104 shown in FIG. 29. The combustion is changed over in this manner whenever a combustion changeover command is produced.

Figure 27:
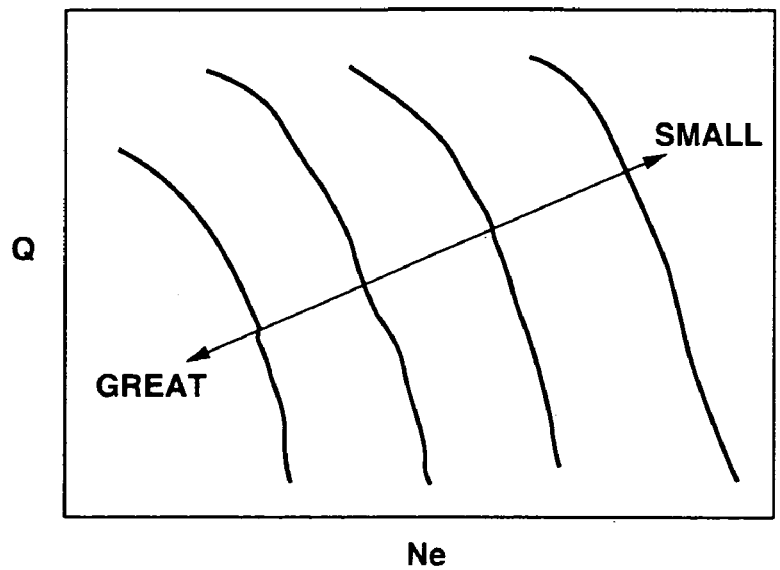
FIG. 27 is a view showing a target fuel injection quantity for preliminary combustion according to the embodiment.
Figure 28:
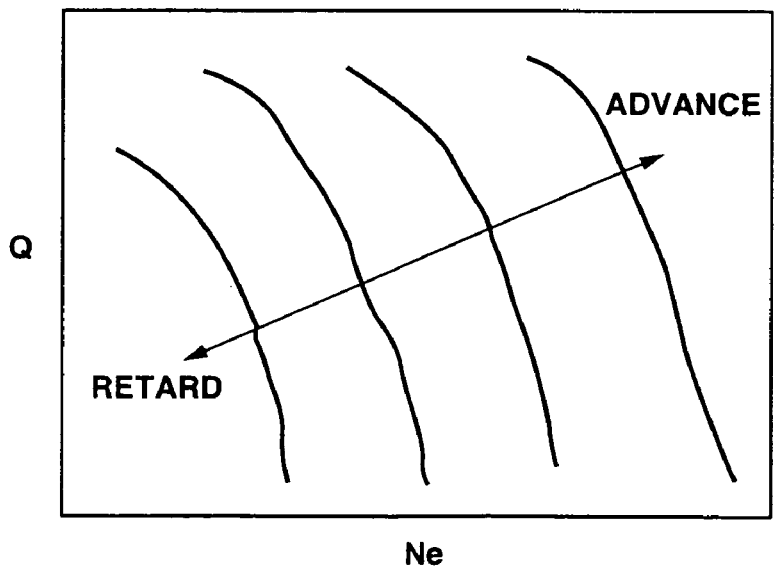
FIG. 28 is a view showing target fuel injection timing for preliminary combustion according to the embodiment.

In response to a combustion changeover command ascertained at S1101, the combustion control system first performs a preliminary fuel injection to produce preliminary combustion at step S1102. The fuel injection quantity for the preliminary fuel injection is determined as shown in FIG. 27, in accordance with engine speed Ne and the fuel injection quantity Q, and the fuel injection timing for the preliminary fuel injection is determined as shown in FIG. 28 in accordance with engine speed Ne and fuel injection quantity Q.

At step S1103, the combustion control system performs a main fuel injection for the main combustion. The injection timing for the main injection is determined in engine speed Ne and fuel injection quantity Q, as shown in FIG. 19. The injection quantity of the main injection is calculated by multiplying the fuel injection quantity before the changeover, by a correction coefficient shown in FIG. 23. Thus, even if the injection timing of the main combustion is largely retarded, the torque is held substantially equal to the torque before the combustion changeover.

As the injection quantity and injection timing for the main combustion are thus shifted after the preliminary combustion is realized first, the combustion control system can shift the combustion state promptly.

Figure 21:
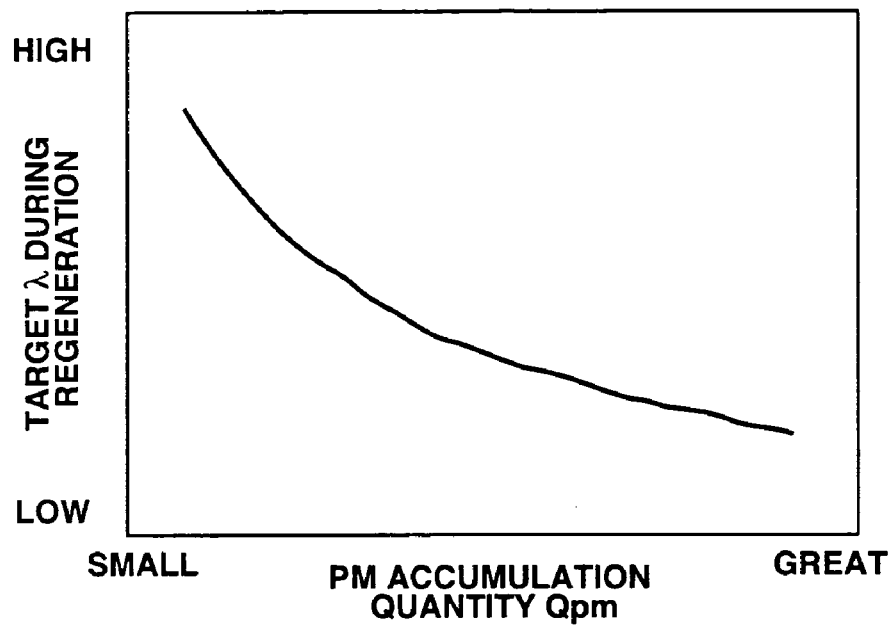
FIG. 21 is a view showing a target air-fuel ratio with respect to the PM accumulated quantity of deposited PM.

At step S102 of FIG. 3, ECU 25 controls the exhaust air-fuel ratio to a target air-fuel ratio. The target air-fuel ratio in the regeneration of DPF 14 differs depending on the PM accumulation quantity of deposited PM. Therefore, the PM accumulation quantity of deposited PM is predicted or estimated from an exhaust pressure threshold value of DPF 14 shown in FIG. 20 and the exhaust gas is controlled to a target air-fuel ratio corresponding to the predicted quantity of deposited PM shown in FIG. 21.

Figure 22:
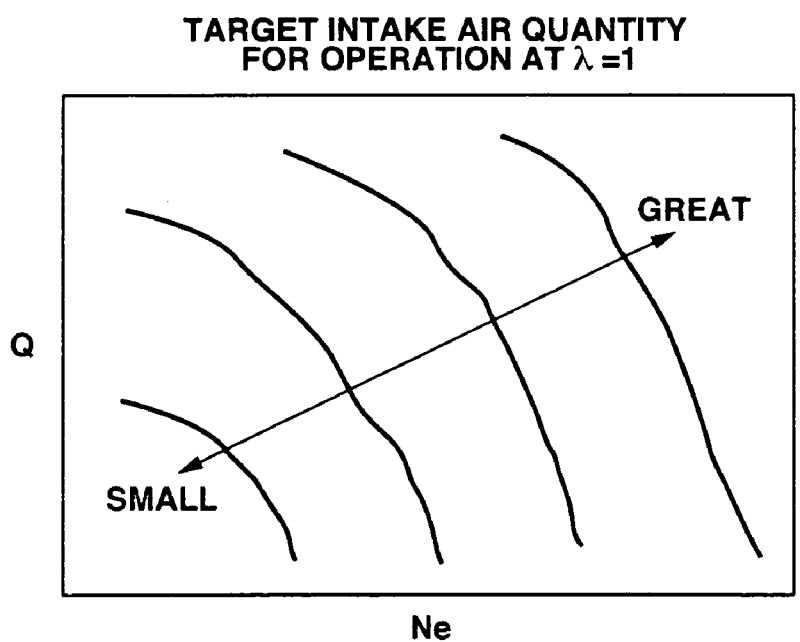
FIG. 22 is a view showing a target intake air quantity.

After the combustion mode is changed over to the split retard combustion mode at S101, the exhaust air-fuel ratio is controlled to the target exhaust air-fuel ratio by throttle valve 6 or EGR valve 19. To realize a target intake air quantity, the quantity of air is controlled by throttle valve 6 to a target air quantity (target intake air quantity for operation at $\lambda=1$) calculated by multiplying the target air-fuel ratio by a value in a map shown in FIG. 22. If the air-fuel ratio is deviated from the target value after the quantity of air is controlled to the quantity of air shown in FIG. 22, the air-fuel ratio is adjusted to the target air-fuel ratio by throttle valve 6 or EGR valve 19.

Figure 23:
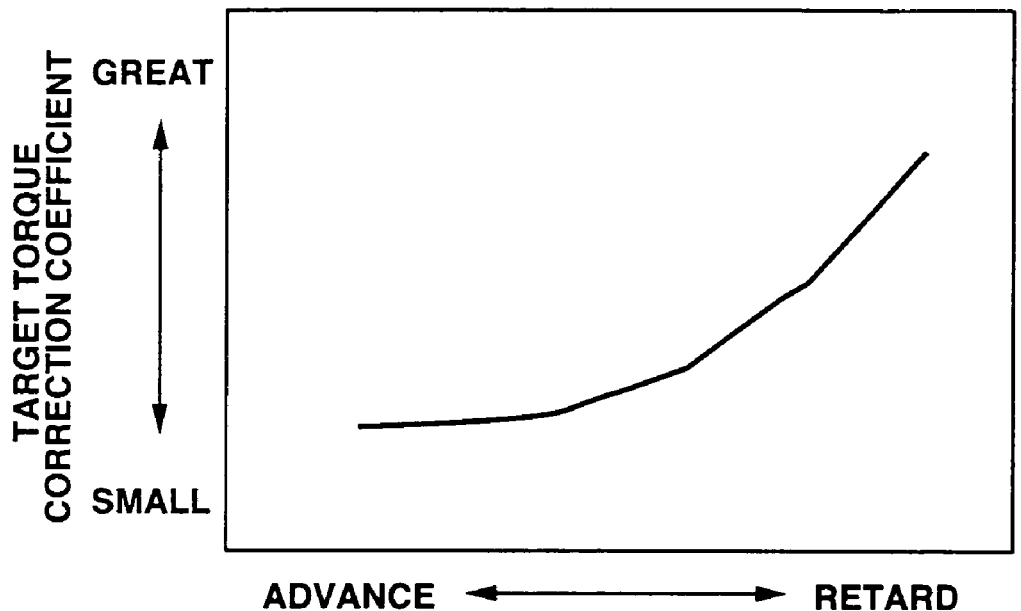
FIG. 23 is a view for calculating a torque correction coefficient corresponding to target fuel injection timing.
Figure 30:
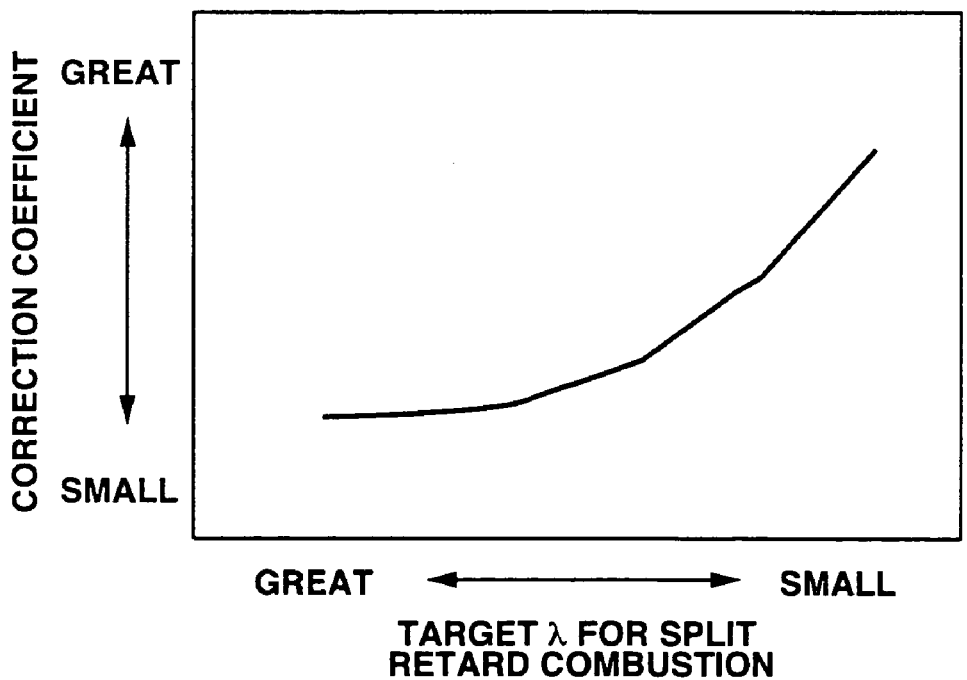
FIG. 30 is a view showing an injection quantity correction coefficient for main combustion corresponding to a target air-fuel ratio.

However, at the time of combustion changeover to the split retard combustion mode, the fuel injection timing is largely shifted in the retard direction. Therefore, in addition to the above-mentioned control of the intake air quantity, the combustion control system of this example corrects the target intake air quantity of FIG. 22 and the fuel injection quantity, with a torque correction coefficient determined in dependence on the target fuel injection timing as shown in FIG. 23, for restraining torque changes in torque at the time of combustion changeover. Moreover, if the target air-fuel ratio $\lambda$ is reduced to 1 or a value close to one, pumping loss due to intake air throttle occurs. Therefore, the control system of this example corrects the target intake air quantity and the fuel injection quantity to values calculated by multiplication by a correction coefficient determined in accordance with the target $\lambda$, as shown in FIG. 30.

At step S103, ECU 25 examines whether or not the temperature of DPF 14 is equal to or higher than a target lower limit value (predetermined temperature) T22 during regeneration (DPF temperature$\geq$T22). If the DPF temperature is equal to or higher than the target temperature lower limit value T22 (DPF temperature$\geq$T22), ECU 25 proceeds from S103 to step S104. On the other hand, if it is less than the target lower limit value T22 (DPF temperature<T22), ECU 25 proceeds from S103 to steps 111 and 112.

At step S104, ECU 25 examines whether or not the temperature of DPF 14 is equal to or lower than a target upper limit value (predetermined temperature) T21 during regeneration (DPF temperature$\leq$T21). If the DPF temperature is equal to or lower than the target temperature upper limit value T21 (DPF temperature$\leq$T21), ECU 25 proceeds from S104 to step S105. On the other hand, if it is over the target temperature upper limit value T21 (DPF temperature>T21), ECU 25 proceeds to steps 109 and 110.

At step S105, ECU 25 examines whether or not a time t taken for controlling the exhaust air-fuel ratio to the target value is over a reference time tDPFreg1 (t>tDPFreg1). If the time t elapsed for the exhaust air-fuel ratio control is longer than the reference time tDPFreg1 (t>tDPFreg1), ECU proceeds to step S106. Thus, this combustion control system can burn and remove the PM deposited in DPF 14 securely. On the other hand, if it is determined that the time t is not over the reference time tDPFreg1 (t$\leq$tDPFreg1), ECU 25 terminates the process of FIG. 3.

At step S106, the combustion control system returns the combustion mode from the split retard combustion mode to the normal combustion mode, and thereby terminates the operation for heating DPF 14. Thereafter, at step S107, ECU 25 resets the reg flag Freg of the DPF regeneration mode to 0, and terminates the regeneration of DPF 14.

At step S108 following S107, ECU 25 sets the rec flag Frec of the melting prevention mode to one. By so doing, this combustion control system protects DPF 14 from being damaged by melting due to burning-up of PM left unburned in DPF 14 after the end of DPF regeneration, by abrupt increase in the exhaust air-fuel ratio. Thus, ECU 25 terminates the process of FIG. 3 by setting the rec flag Frec for the melting prevention mode after the regeneration mode or the sulfur poisoning recovering mode.

At step S111 reached from S103, the combustion control system retards the main fuel injection timing for the main combustion. Thus, the control system of this example increases the exhaust gas temperature by retarding the fuel injection timing for the main combustion by a predetermined amount when the DPF temperature becomes lower than the lower limit value T22 (DPF temperature<T22) during DPF regeneration.

At step S112, ECU 25 adjusts torque in accordance with the amount of retard of the main fuel injection timing for the main combustion. Since torque is lowered by the retardation of the main fuel injection timing, ECU 25 calculates a target torque correction coefficient in accordance with the amount of retardation by using a torque correction coefficient calculation map of a torque correction coefficient with respect to the fuel injection timing for the main combustion shown in FIG. 23; and adjusts the torque by using the calculated torque correction coefficient. Then, ECU 25 terminates the process of FIG. 3.

At step S109 reached from S104, the combustion control system of this example advances the main fuel injection timing for the main combustion. Thus, the control system decreases the exhaust gas temperature by advancing the main furl injection timing by a predetermined amount when the DPF temperature becomes higher than the upper limit value T21 (DPF temperature>T21) during DPF regeneration.

At step S110, ECU 25 calculates the target torque correction coefficient in accordance with the amount of the advance by using the torque correction coefficient calculation map shown in FIG. 23; and adjusts the torque by using the calculated torque correction coefficient. Then, ECU 25 terminates the process of FIG. 3.

Figure 4:
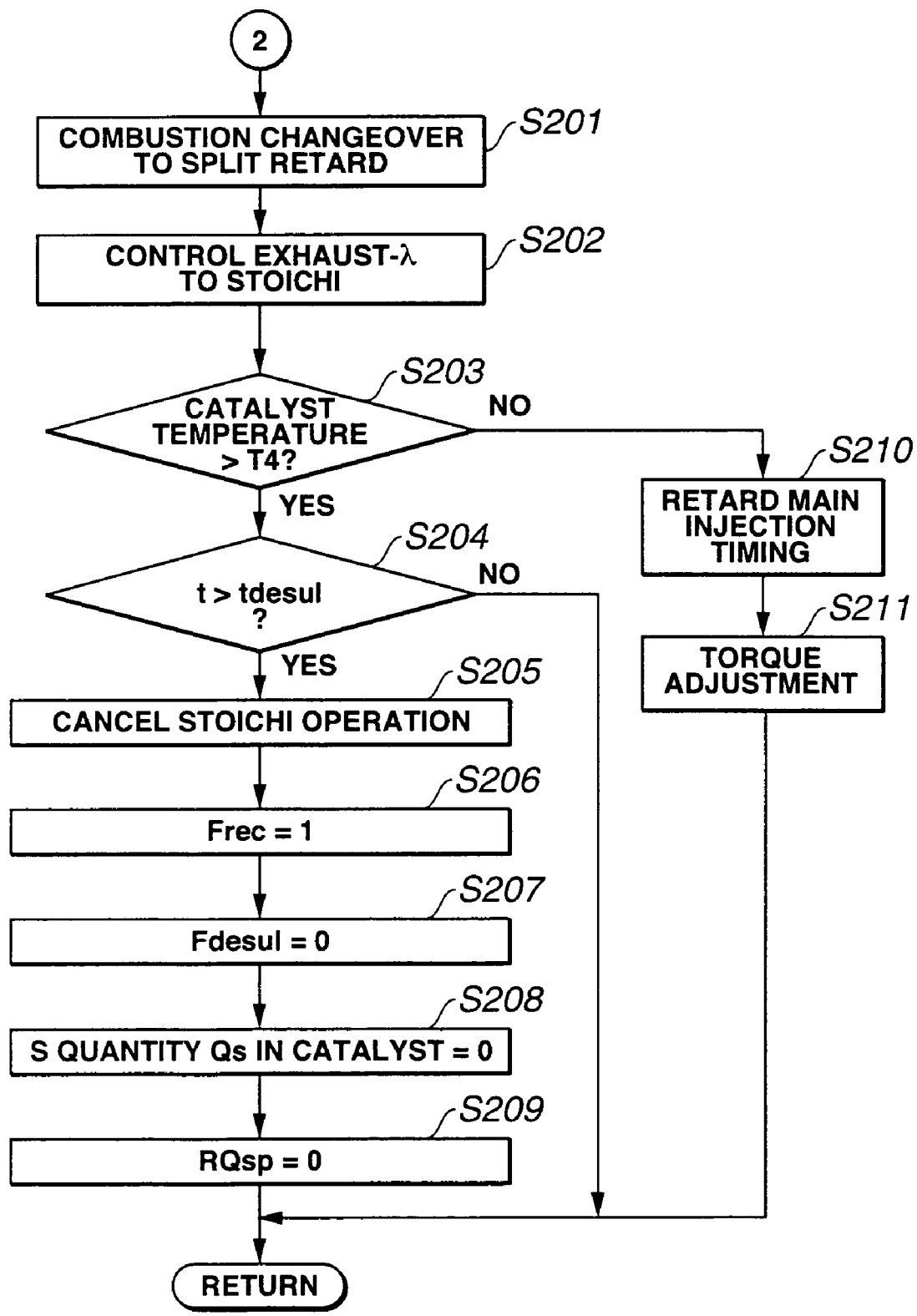
FIG. 4 is a flowchart of a sulfur poisoning recovery process performed by the combustion control system of FIG. 1.

FIG. 4 shows the process for the sulfur poisoning recovery.

At step S201, the combustion control system changes over the combustion mode to the split retard combustion mode, like S101 of FIG. 3, in response to a request for the sulfur poisoning recovery at a high exhaust gas temperature in a rich atmosphere.

At step S202, the control system controls the exhaust air-fuel ratio to the stoichiometry since the sulfur content accumulation quantity Qs of deposited sulfur content in NOx trap catalyst 13 has reached the predetermined quantity. Then, the control system throttles the intake air flow by reducing the opening of throttle valve 6 to attain the target intake air quantity shown in FIG. 22 (the intake air quantity to realize $\lambda=1$), and thus achieves the target air-fuel ratio. If the actual air-fuel ratio is deviated from the target air-fuel ratio, the control system adjusts the exhaust air-fuel ratio by throttle valve 6 or EGR valve 19. Thus, the intake air quantity and fuel injection quantity are corrected in accordance with the fuel injection timing for the main combustion, like step S102.

At step S203, ECU 25 examines whether or not the temperature of NOx trap catalyst 13 is higher than a predetermined temperature T4 (catalyst temperature>T4). For example, in the case where a Ba-based NOx trap catalyst is used as NOx trap catalyst 13, the temperature must be higher than 600° C. in a rich to stoichiometric atmosphere and therefore the predetermined temperature T4 is set equal to 600° C.

If the catalyst temperature is higher than the predetermined temperature T4 (catalyst temperature>T4), ECU 25 proceeds from S203 to step S204. On the other hand, if the catalyst temperature is equal to or lower than predetermined temperature T4 (catalyst temperature$\leqq$T4), ECU 25 proceeds to step S210.

At step 204, ECU 25 examines whether or not the sulfur poisoning recovery operation is carried out at a target air-fuel ratio and at a target bed temperature for a predetermined time tdesul (t>tdesul). If the sulfur poisoning recover operation is continued properly for a time longer than tdesul (t>tdesul), ECU 25 proceeds to step S205. On the other hand, if the sulfur poisoning recovery operation is not yet carried out sufficiently (t$\leqq$tdesul), ECU 25 terminates the process of FIG. 4.

At step S205, ECU 25 cancels the stoichiometric operation since the sulfur poisoning recovery is finished.

At step S206, ECU 25 sets the rec flag Frec of the melting prevention mode (Frec=1). Thus, the control system protects DPF 14 from being damaged by melting due to burning-up of PM left in DPF 14 under a condition of a high temperature after the end of sulfur poisoning recovery, by abrupt increase in the exhaust air-fuel ratio.

At step S207, ECU 25 resets the desul flag Fdesul to zero since the sulfur poisoning recovery mode has ended.

At step S208, ECU 25 resets the sulfur content accumulation quantity Qs of deposited sulfur content in NOx trap catalyst 13 to zero (Qs=0) since the sulfur poisoning recovering operation is finished.

At step S209, ECU 25 resets the rq_sp flag RQsp for the NOx regeneration to 0 (RQsp=0). This is because by the sulfur poisoning recover, NOx trap catalyst 13 is exposed to the condition of stoichiometric air-fuel ratio for a long time, and hence NOx regeneration is carried out. Then, if a request for NOx regeneration is present, the NOx regeneration is carried out simultaneously with the sulfur poisoning recovery.

Step S210 is reached from S203 when the catalyst temperature is lower than or equal to T4. Operations in S210 and S211 are similar to the above-mentioned operations of steps S111 and S112 in FIG. 3. That is, at step 210, the control system retards the fuel injection timing for the main combustion by a predetermined amount to increase the exhaust gas temperature since the temperature of NOx trap catalyst 13 is equal to or lower than the predetermined temperature T4 (catalyst temperature$\leqq$T4).

At step S211, ECU 25 calculates the target torque correction coefficient in accordance with the amount of the retard by using the torque correction coefficient calculation map shown in FIG. 23; and adjusts the torque by using the calculated torque correction coefficient. Then, ECU 25 terminates the process of FIG. 4.

Figure 5:
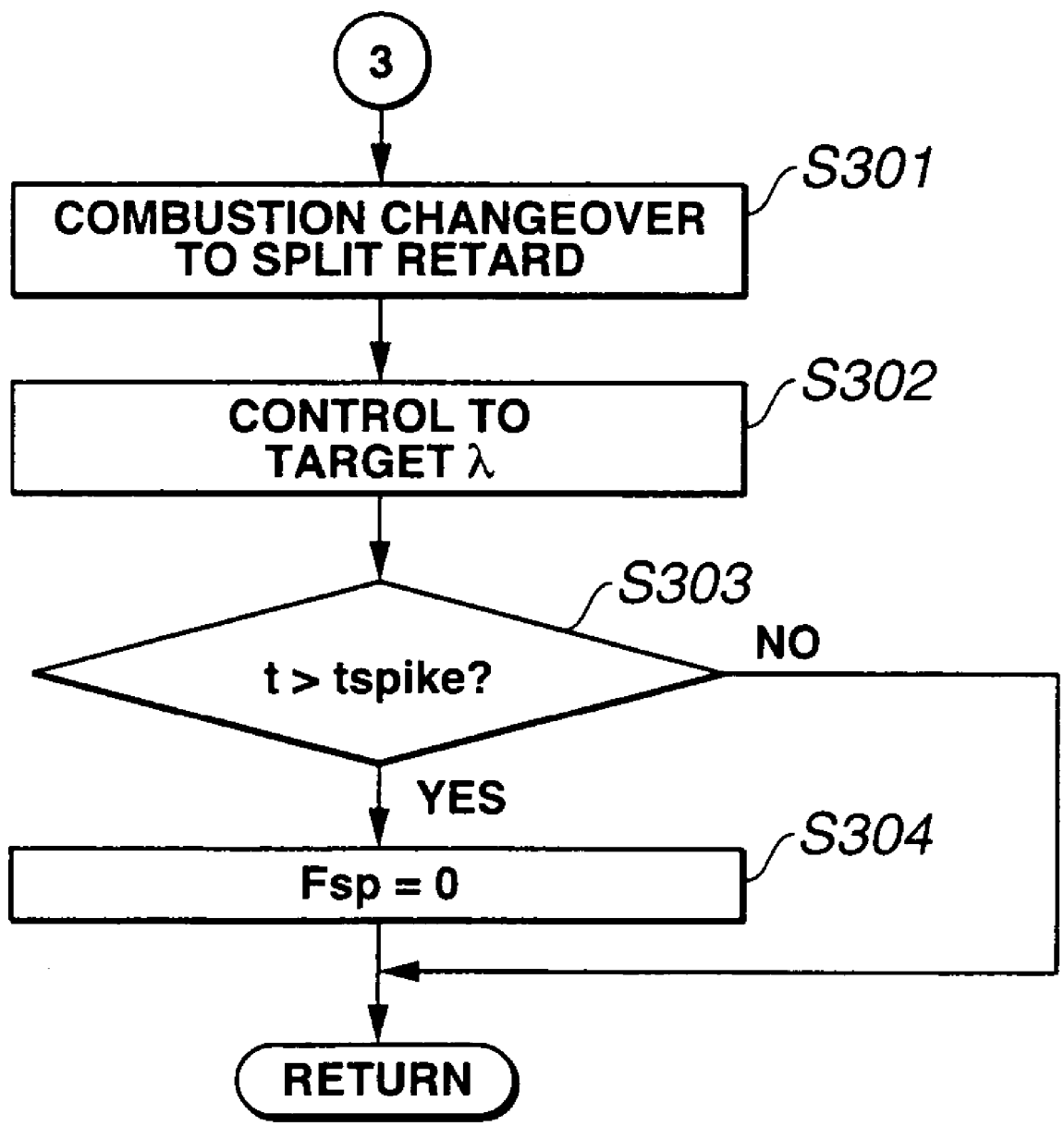
FIG. 5 is a flowchart of a rich spike combustion control process performed by the combustion control system of FIG. 1.

FIG. 5 shows a rich spike control process performed when Fsp=1.

At step S301, the combustion control system changes over the combustion mode. In this example, the combustion mode is changed over to the split retard combustion mode.

Figure 24:
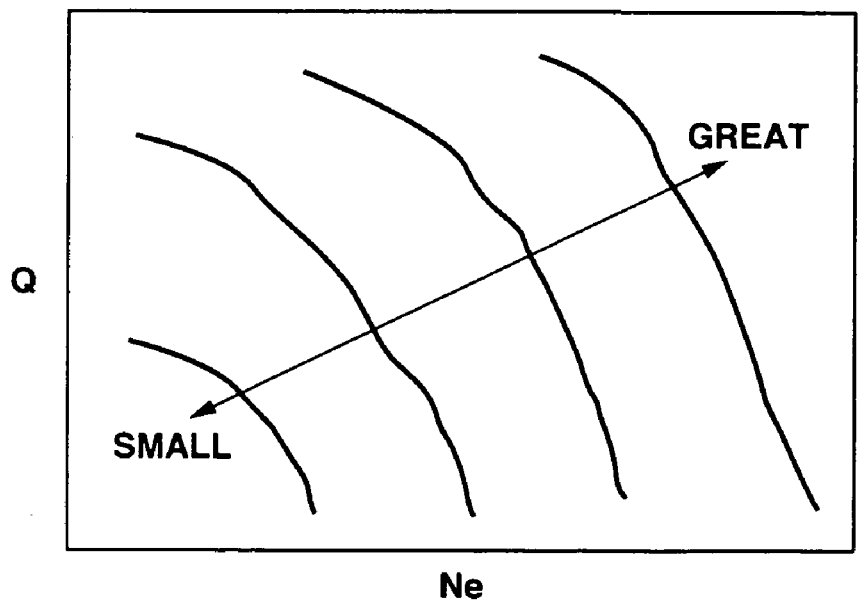
FIG. 24 is a view showing a target intake air quantity for a rich spike operation.

At step S302, the air-fuel ratio is controlled to a predetermined target air-fuel ratio for carrying out the rich spike control. The target air-fuel ratio is realized by adjusting the intake air quantity to the intake air quantity shown in FIG. 24. Thus, when the rich spike control is carried out, the combustion control system supplies a reducing agent into the exhaust gas upstream of NOx trap catalyst 13 at proper timing in short cycles, and thereby lowers the air-fuel ratio of the exhaust gas flowing into NOx trap catalyst 13 temporarily so that NOx trapped in NOx trap catalyst 13 is released and reduced.

At step S303, ECU 25 examines whether or not the time taken for carrying out the rich spike control (at a rich condition) is over a predetermined time tspike (t>tspike). If it is over the predetermined time tspike (t>tspike), ECU 25 proceeds to step S304. On the other hand, if it is not over the predetermined time tspike (t$\leqq$tspike), ECU 25 terminates the process of FIG. 5.

At step S304, the spike flag Fsp is reset to 0 (Fsp=0). Thus, the control system carries out the rich spike control for the predetermined time tspike, and then cancels the rich operation at the end of the predetermined time tspike.

Figure 6:
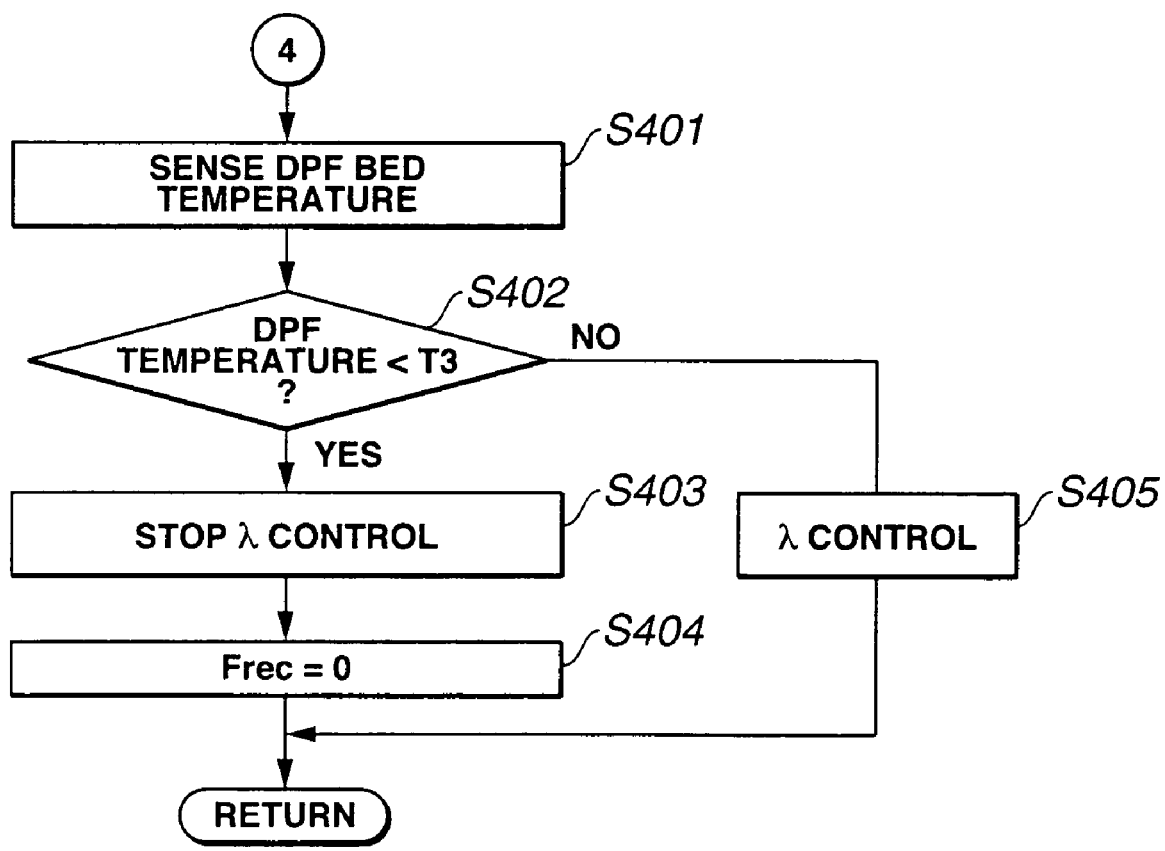
FIG. 6 is a flowchart of a melting prevention process performed by the combustion control system of FIG. 1.

FIG. 6 shows the melting prevention control.

At step S401, the temperature of DPF 14 is detected. If it is difficult to directly detect the temperature of DPF 14, the temperature of DPF 14 is estimated from a substitute parameter (such as the exhaust gas temperature).

At step S402, ECU 25 examines whether or not the temperature of DPF 14 is lower than a predetermined temperature T3 (DPF temperature<T3). Thus, the control system determines whether or not the DPF temperature is lower than the temperature T3 at which there is no risk of start of abrupt oxidation of PM (DPF temperature<T3).

If the temperature of DPF 14 is lower than the predetermined temperature (DPF temperature<T3), ECU 25 proceeds from S402 to step S403. This enables avoidance of melting in DPF 14 even when the oxygen concentration becomes equal to that of the atmosphere.

Figure 25:
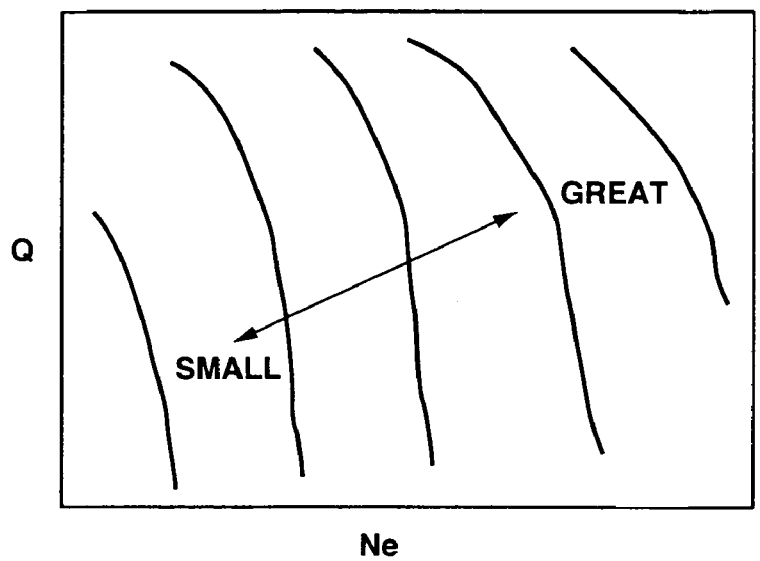
FIG. 25 is a view showing a target intake air quantity for preventing DPF melting.

On the other hand, if the temperature of DPF 14 is equal to or higher than the predetermined temperature T3 (DPF temperature≧T3), ECU 25 proceeds from S402 to step S405. At S405, the control system controls the exhaust air-fuel ratio to a value equal to or less than a predetermined value to lower the exhaust gas temperature, and then terminates the process of FIG. 6. In this case, since a lower exhaust gas temperature is desired, the exhaust air-fuel ratio is controlled to the predetermined value by the normal lean combustion (combustion shown in FIG. 13) instead of the split retard combustion. Then, the intake air quantity is set to the target intake air quantity shown in FIG. 25. If the sensor output is deviated from the target air-fuel ratio, the target air-fuel ratio is realized by adjusting throttle valve 6 or EGR valve 19.

At step S403, since there is no risk of melting of DPF 14, the control system terminates the air-fuel ratio control.

At step S404, rec flag Frec of the melting prevention mode is reset to 0 (Frec=0). The melting prevention mode thus ends.

Figure 7:
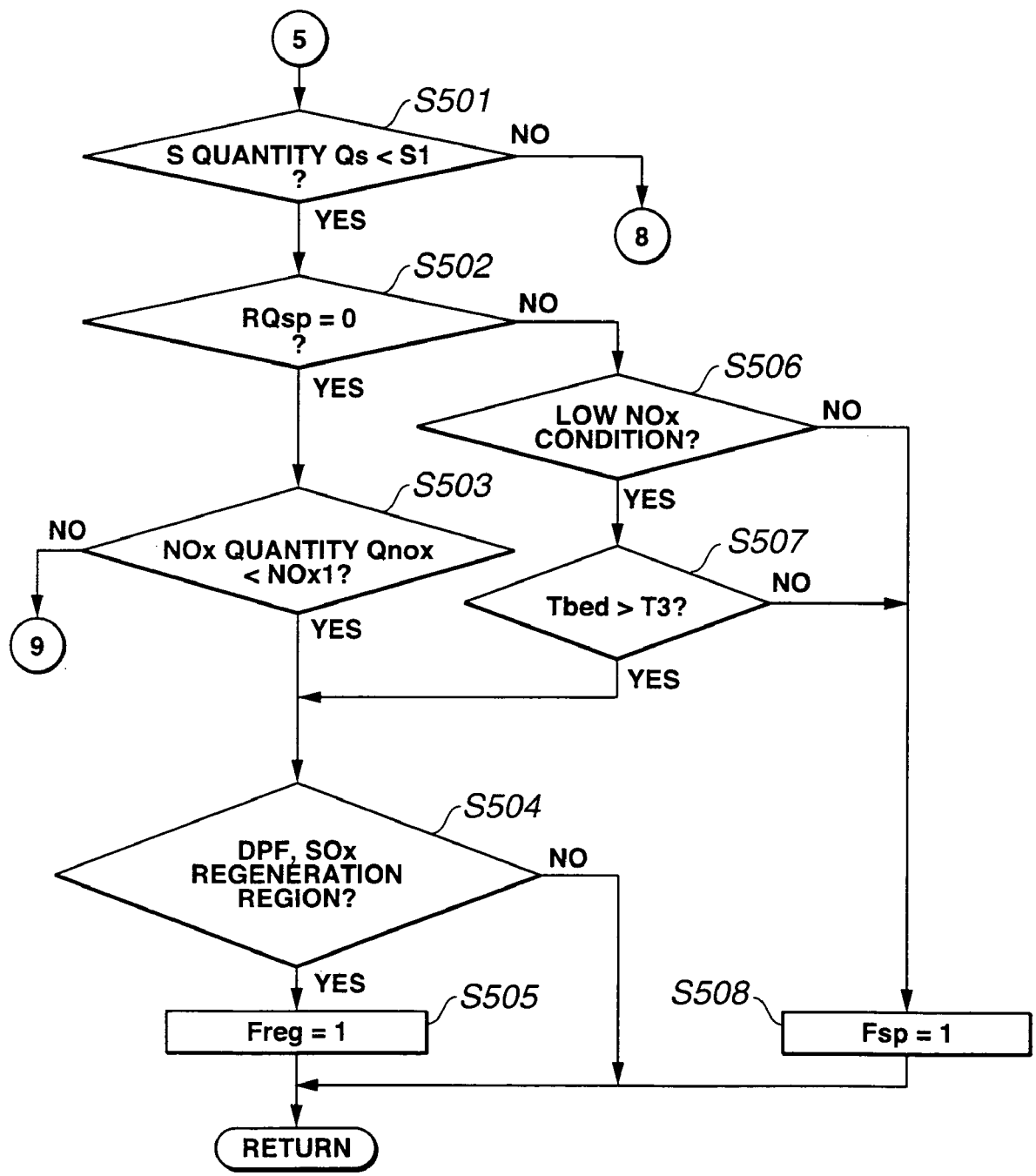
FIG. 7 is a flowchart of a priority determining process performed by the combustion control system of FIG. 1, for determining priority of the DPF regeneration, NOx regeneration, and sulfur poisoning recovery.

FIG. 7 shows a process for determining the priority in the case where a DPF regeneration request and one or both of a NOx regeneration request and a sulfur poisoning recovery request are simultaneously issued.

At step S501, ECU 25 checks the sulfur content accumulation quantity Qs to determine whether or not the sulfur content accumulation quantity Qs of deposited sulfur content is less than predetermined quantity S1 requiring the sulfur poisoning recovery or desulfurization. If it is less than predetermined quantity S1 (Qs<S1), ECU 25 proceeds from S501 to step S502. On the other hand, if it is equal to or more than predetermined quantity S1 (Qs≧S1), ECU 25 proceeds to the process of FIG. 10.

At step S502, ECU 25 checks the presence/absence of a NOx regeneration request (spike request) RQsp. If there is no NOx regeneration request (RQsp=0), ECU 25 proceeds to step S503. On the other hand, if there is a NOx regeneration request (RQsp=1), ECU 25 proceeds to step S506.

At step S503, ECU 25 examines whether or not the NOx accumulation quantity Qnox of deposited NOx is less than predetermined quantity NOx1 that requires NOx regeneration (Qnox<NOx1) after the DPF regeneration request is issued. If it is less than the predetermined quantity NOx1 (Qnox<NOx1), ECU 25 proceeds to step S504. On the other hand, if it is equal to or more than the predetermined quantity NOx1 (Qnox≧NOx1), ECU 25 proceeds to the process of FIG. 11.

Figure 26:
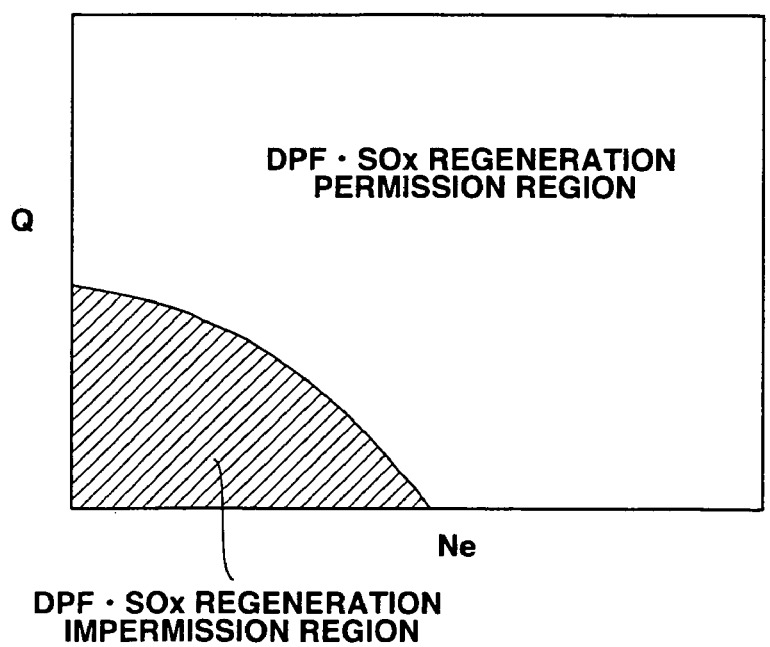
FIG. 26 is a view showing a DFP·SOx regeneration permission region.

At step S504, ECU 25 examines whether or not the operating point is in a DPF regeneration and SOx regeneration (sulfur poisoning recovery or desulfurization) permission region. In this example, ECU 25 determines whether or not the operating point is in the DPF regeneration and SOx regeneration permission region, in accordance with the current engine rotational speed Ne and load, by using a DPF·SOx regeneration permission map shown in FIG. 26. If the current operating point determined by the current engine speed Ne and engine load is in the regeneration permission region, ECU 25 proceeds to step S505. On the other hand, if it is not in the regeneration permission region and hence the answer of S504 is negative, ECU 25 terminates the process of FIG. 7.

At step S505, ECU 25 set the reg flag Freg of the regeneration mode to 1 (Freg=1). Thus, since there are no requests for NOx regeneration and SOx regeneration and the engine operating point is in the DPF regeneration permission region in the state where the DPF regeneration request is made, the combustion control system proceeds to the DPF regeneration.

At step S506 reached from S502, ECU 25 examines whether a low NOx condition is present or not. This is for judging whether the engine is in a condition of low NOx emission, for example, a steady state condition, since both the DPF regeneration request and the NOx regeneration request are issued.

If the low NOx condition is affirmed, ECU 25 proceeds to step S507. This is for the following reasons. Under the condition of low NOx emission, even if the regeneration of trapped NOx is delayed more or less, the exhaust from the tail pipe is hardly deteriorated. Therefore, the regeneration of DPF 14, which largely affects the driveability, is preferentially carried out. Under a condition of high NOx emission, for example, under an accelerating condition, the regeneration of NOx is preferentially carried out in order to prevent deterioration of exhaust from the tail pipe.

On the other hand, if the low NOx condition is not affirmed and hence the answer of S506 is negative, ECU 25 proceeds to step S508, and sets the sp flag Fsp to 1 (Fsp=1). The process of FIG. 7 then ends.

At step S507, ECU 25 examines whether or not the bed temperature Tbed of DPF 14 is higher than the predetermined temperature T3 (Tbed>T3). Whether to preferentially carry out the NOx regeneration or not is thus judged. If DPF bed temperature Tbed is higher than predetermined temperature T3 (Tbed>T3), ECU 25 proceeds to step S504. On the other hand, if it is equal to or lower than the predetermined temperature T3 (Tbed≦T3), ECU 25 proceeds to S508. This is for the following reasons. When temperature rise of DPF 14 starts, if the temperature is equal to or less than T3 (Tbed≦T3), at which NOx trap catalyst 13 carried by DPF 14 is activated, it takes time until a regeneration possible temperature is reached after the temperature rise is started. Therefore, the risk of deterioration of NOx from the tail pipe during the temperature rise is considered, and the regeneration of NOx is preferentially carried out.

At step 508, since priority is given to the NOx regeneration, ECU 25 sets the spike flag to one (Fsp=1) and proceeds to the NOx regeneration.

Figure 8:
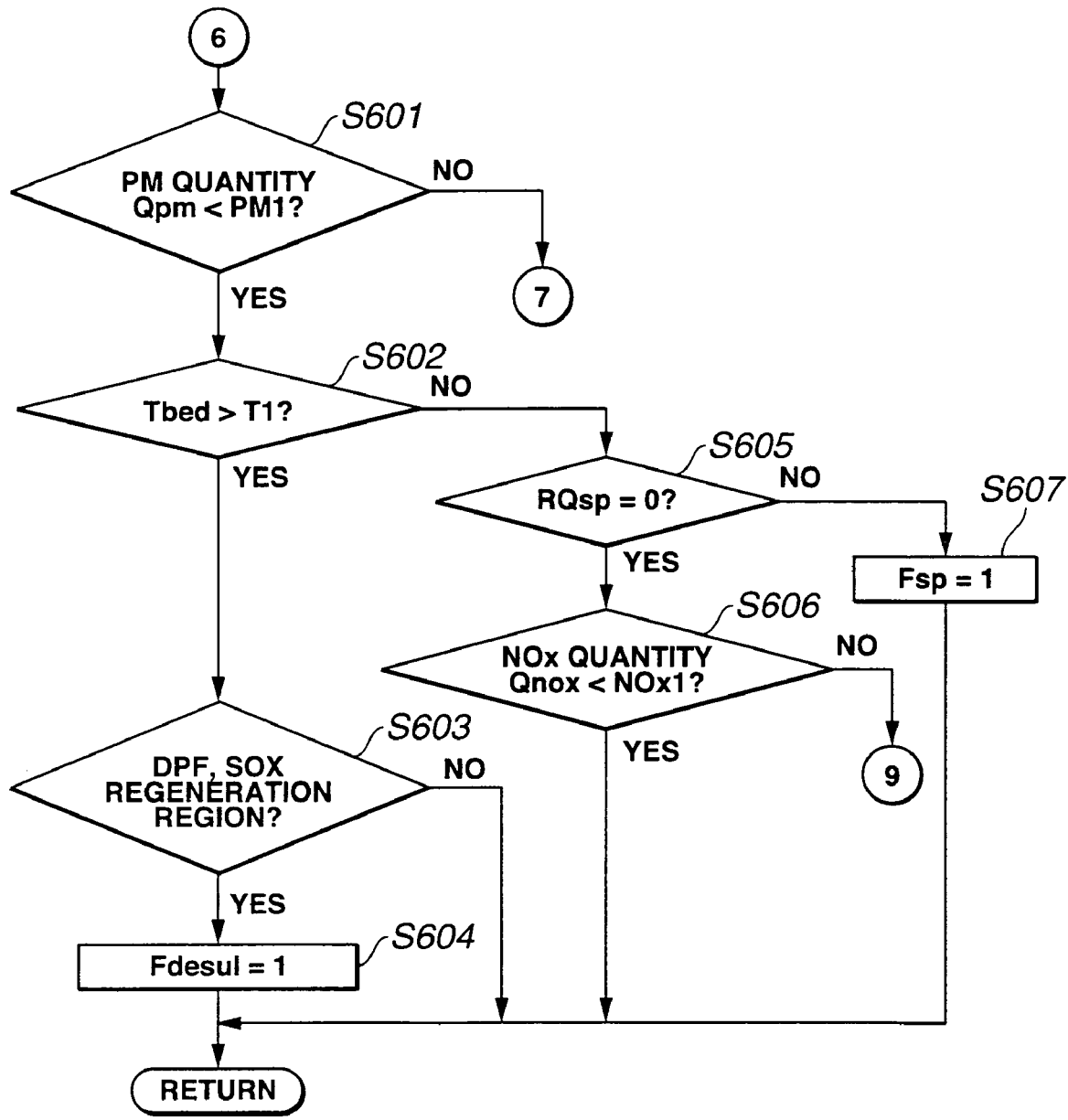
FIG. 8 is a flowchart of a priority determining process performed by the combustion control system of FIG. 1, for determining the priority of SOx regeneration and NOx regeneration.
Figure 9:
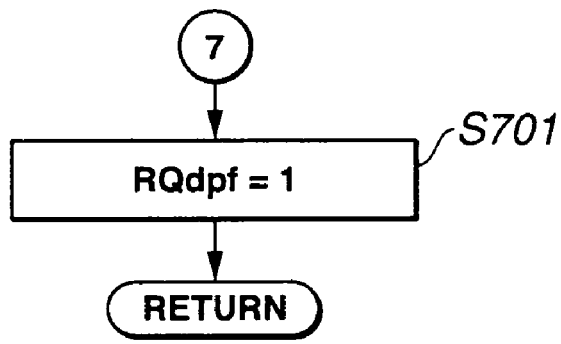
FIG. 9 is a flowchart of DPF regeneration request flag setting process formed by the combustion control system of FIG. 1.

FIG. 8 shows the process for determining the priority between the SOx regeneration and NOx regeneration in the case where a SOx regeneration request and a NOx regeneration request are simultaneously issued.

At step S601, ECU 25 examines whether or not the PM accumulation quantity Qpm of PM deposited in DPF 14 is less than predetermined quantity PM1 (Qpm<PM1). If it is less than the predetermined quantity PM1 (Qpm<PM1), ECU 25 proceeds to step S602. On the other hand, if it is equal to or more than predetermined quantity PM1 (Qpm≧PM1), the combustion control system sets rq_DPF flag RQdpf to 1 at S701 of FIG. 9, and carries out the regeneration of DPF 14. Thus, priority is given to the DPF regeneration even if the SOx regeneration request is issued.

At step S602, ECU 25 examines whether or not the bed temperature Tbed of NOx trap catalyst 13 is higher than a predetermined temperature T1 (Tbed>T1). The predetermined temperature T1 is a temperature suitable for SOx regeneration of the carried NOx trap catalyst 13. If the bed temperature Tbed of NOx trap catalyst 13 is higher than predetermined temperature T1 (Tbed>T1), ECU 25 proceeds From S602 to step S603. On the other hand, if it is equal to or lower than the predetermined temperature T1 (Tbed≦T1), ECU 25 proceeds from S602 to step S605. This is for the following reason. Since it takes time to reach the temperature that enables regeneration after temperature rise is started, the risk of deterioration of NOx from the tail pipe during the temperature rise is considered and the NOx regeneration is preferentially carried out.

At step S603, ECU 25 determines whether or not the engine operating point is in the DPF and SOx regeneration (sulfur poisoning reocovery or desulfurization) permission region. The region where these regenerations are possible is judged on the basis of the current engine rotational speed Ne and load, using the DPF regeneration and SOx regeneration permission region map shown in FIG. 26, similarly to the above-described step S504. If the current engine operating point determined by the current engine speed and load is in the regeneration permission region, ECU 25 proceeds to step S604. On the other hand, if it is not in the regeneration permission region (if it is in the regeneration impermission region), the process of FIG. 8 ends.

At step S604, ECU 25 sets the desul flag Fdesul to one (Fdesul=1) and terminates the process of FIG. 8. This is for shifting to the SOx regeneration because all the conditions are met, that is, there are no spike request and no DPF regeneration request, the bed temperature is equal to or higher than the predetermined value, and the operating point is in the regeneration permission region.

At step S605 reached from S602, ECU 25 checks whether a spike request is present or absent. If there is no spike request (RQsp=0), ECU 25 proceeds to step S606. Thus, even when the SOx regeneration request is issued, if the temperature of NOx trap catalyst 13 is equal to or lower than the predetermined temperature T1 (NOx trap catalyst temperature≦T1), the NOx regeneration is preferentially carried out to restrain NOx deterioration from the tail pipe.

On the other hand, if the spike request is present (RQsp=1), ECU 25 proceeds from S605 to step S607 and sets the NOx regeneration flag Fsp to one (Fsp=1) to shift to the NOx regeneration. Thus, it is determined that NOx regeneration should be preferentially carried out even if the SOx regeneration request is issued.

At step S606, ECU 25 examines whether or not the NOx accumulation quantity of deposited NOx is less than the predetermined quantity NOx1 that requires NOx regeneration (Qnox<NOx1) after the issuance of the SOx regeneration request. If it is less than predetermined quantity NOx1 (Qnox<NOx1), the process of FIG. 8 ends. On the other hand, if it is equal to or more than predetermined quantity NOx1 (Qnox≧NOx1), ECU 25 proceeds to step S901 in FIG. 11, and sets the rq_sp flag RQsp to one (RQsp=1) to issue a NOx regeneration request.

FIG. 12 shows the process to warm up NOx trap catalyst 13 by utilizing the split retard combustion control mode of the preliminary combustion and the main combustion. The process of FIG. 12 is performed when the answer of step S2 of FIG. 2 is negative.

At step S1001, ECU 25 examines whether or not a warm-up promoting operation of NOx trap catalyst 13 is possible. This is because it is determined that the temperature of NOx trap catalyst 13 is equal to or lower than the activation temperature T5 (catalyst temperature≦T5) and hence the temperature rise of NOx trap catalyst 13 by the warm-up promoting operation is demanded. This judgment is made, based on the current engine rotational speed Ne and load, by checking whether or not the engine operating point determined by the current engine speed and load is in the DPF and SOx regeneration permission region shown in FIG. 26.

If the warm up promoting operation is permitted, ECU 25 proceeds to step S1002. On the other hand, if the engine operating point is not in the permission region, and the warm up promoting operation is not permitted, the process of FIG. 12 ends.

At step S1002, the control system changes over the combustion mode to the split retard combustion mode. Thus, the temperature in the cylinder near the compression top dead center is raised by carrying out the preliminary combustion and the range of ignition delay of the main combustion is expanded. By performing the split retard combustion, this combustion control system increases the exhaust gas temperature, and thereby promotes the warm up of NOx trap catalyst 13.

At step S1003 following S1002, ECU 25 examines whether or not the temperature of NOx trap catalyst 13 has become higher than the activation temperature (predetermined temperature) T5 (catalyst temperature>T5). If it is higher than predetermined temperature T5 (catalyst temperature>T5), ECU 25 proceeds to step S1004. On the other hand, if it is equal to or lower than predetermined temperature T5 (catalyst temperature≦T5), the process of FIG. 12 ends and the combustion control in the split retard mode is continued.

At step S1004, the warm up promoting operation is canceled. Thus, since it is judged that NOx trap catalyst 13 has been sufficiently warmed up, that is, NOx trap catalyst 13 has been activated, the control system changes over the combustion mode from the split retard combustion mode to the normal combustion mode, and thereby terminates the warm up of NOx trap catalyst 13.

According to the illustrated embodiment of the present invention, the combustion control system or apparatus for internal combustion engine 1, includes at least: an exhaust purifier or purifying device (NOx trap catalyst 13 and/or DPF 14) disposed in exhaust passage 12 of the internal combustion engine; a combustion controlling actuator including at least one fuel injector 10 to produce main combustion, and to produce preliminary combustion prior to the main combustion; and a controller 25 including at least ECU 25 to control fuel injection to produce the preliminary combustion, and to control fuel injection to start the main combustion after an end of the preliminary combustion. Therefore, this combustion control system can increase the incylinder temperature beforehand by the preliminary combustion; thereby expand the range of ignition delay (retard limitation) of the main combustion; and reduce smoke emission. Thus, a desired rich atmosphere can be achieved in the cylinder.

The controller (25) performs a preliminary fuel injection to produce the preliminary combustion at or near top dead center, and to perform a main fuel injection to start the main combustion after the preliminary combustion is finished. The controller (25) is configured to control the combustion controlling actuator (including item 10, 6 or 19) in a split combustion mode (utilizing two or more separate combustion processes in one cycle, such as the split retard combustion mode) by controlling the fuel injection to produce the preliminary combustion at or near top dead center, and by controlling the fuel injection to start the main combustion after the end of the preliminary combustion when a split combustion request (such as Freg=1, Fdesul=1, Fsp=1, RQdpf=1, RQdesul=1, NO of S2 or YES of S1001) is produced to bring the exhaust purifier to an operative state (such as a regenerated state or a warmed-up state).

The controller (25) is configured to control the combustion controlling actuator normally in a normal combustion mode, and to change over a combustion control mode from the normal combustion mode to the split combustion mode (at S101, S201, S301, or S1002) in response to the split combustion request produced in accordance with a sensed or estimated condition of the exhaust purifier.

The controller is configured to determine an estimated condition of the exhaust purifier and to produce the split combustion request in accordance with the estimated condition of the exhaust purifier, to request one of an increase in an exhaust gas temperature of the engine and a rich operation of the engine.

Moreover, according to this embodiment, the main combustion is pre-mixed combustion. Therefore, this system carries out the fuel injection for the main combustion in a high-temperature state, expand the range of ignition delay of the main combustion, and restrain the smoke emission effectively.

Also, according to this embodiment, the fuel injection quantity for the preliminary combustion is set equal to a fuel injection quantity necessary for the temperature in the cylinder at the time of fuel injection for the main combustion to exceed a temperature that enables self-ignition. Therefore, as the temperature in the cylinder is raised by fuel injection at the time of the preliminary combustion, a high temperature can be maintained in the cylinder when fuel injection for the main combustion is carried out, and combustion for each cycle can be stabilized.

Moreover, according to this embodiment, the combustion start timing of the main combustion is 20 degrees or more in terms of crank angle apart from the combustion start timing of the preliminary combustion. Therefore, the interval between the start of the preliminary combustion and the start of the main combustion can be made equal to or longer than a predetermined period, and it is possible to restrain deterioration of combustion in the main combustion and prevent deterioration of smoke.

Also, according to this embodiment, the end timing of the main combustion is 50 degrees or more apart in terms of crank angle from the compression top dead center. Therefore, by retarding the timing of the end of the main combustion as much as possible, this control system can prevent the combustion process of the main combustion from becoming sluggish and prevent deterioration in combustion noise.

Moreover, according to this embodiment, fuel injection for the preliminary combustion is carried out one compression stroke of the engine cycle. Therefore, the stability of ignition in the preliminary combustion can be secure.

Also, according to this embodiment, at least one of the fuel injection quantity and the fuel injection timing for the preliminary combustion is adjusted in accordance with the compression end temperature. Therefore, the fuel injection quantity for the preliminary combustion can be set to a minimum quantity in accordance with the compression end temperature under each operating condition, and the stability of the preliminary combustion can be realized. Also, the preliminary combustion can be finished certainly before the main combustion starts.

Moreover, according to this embodiment, in the main combustion, the exhaust temperature is controlled by varying the fuel injection timing. Therefore, the control system can control the exhaust gas temperature flexibly by controlling the combustion end timing of the main combustion.

Also, according to this embodiment, the control system controls the main combustion so as to hold the output torque produced by engine 1 constant. Therefore, by correcting the fuel injection quantity in accordance with the fuel injection timing of the main combustion, the control system can achieve a desired exhaust gas temperature or exhaust atmosphere and thereby restrain changes in torque at the time of combustion changeover and control of the exhaust temperature.

Moreover, according to this embodiment, filter (DPF) 14 for trapping exhaust particulate matter is provided as the exhaust purifying device. The request for the split combustion is produced when the quantity of exhaust particulate matter (PM) deposited in filter 14 amounts to predetermined quantity PM1 (S12) and the temperature is to be increased for auto-oxidation of the exhaust particulate matter. Therefore, the control system can adjust the timing for carrying out combustion control adequately in accordance with the operating conditions (engine speed Ne and fuel injection quantity Q, for example) of engine 1. Thus, the control system can determine the timing of regeneration for DPF 14 properly, change over the combustion to the split combustion mode timely, and thereby achieve stable regeneration of DPF with low smoke emission and high exhaust gas temperature.

Also, according to this embodiment, NOx trap catalyst 13 for trapping NOx at the time of lean operation is provided as the exhaust purifying device. The request for the split combustion mode is produced when NOx trapped in NOx trap catalyst 13 is to be purged. Therefore, the rich spike control can be carried out in the split combustion mode, and the purifying performance of NOx trap catalyst 13 can be maintained high.

When NOx is purged each time a predetermined distance is traveled (steps 3, 12 to 14), the control system can purge NOx at adequate intervals with a simple construction.

Also, according to this embodiment, NOx trap catalyst 13 for trapping NOx at the time of lean operation is provided as the exhaust purifying device. The request for the split combustion mode is produced when sulfur content (SOx) trapped in NOx trap catalyst 13 is to be purged. Therefore, sulfur poisoning recovery or desulfurization (SOx regeneration) can be carried out using the split combustion mode, and both rich conditions of low smoke emission and high exhaust gas temperature can be achieved. The performance of NOx trap catalyst 13 can be maximized.

Moreover, according to this embodiment, since sulfur content is purged each time a predetermined distance is traveled, NOx can be purged at adequate time intervals.

Also, according to this embodiment, NOx trap catalyst 13 for trapping NOx at the time of lean operation is provided as the exhaust purifying device. The request for the split combustion mode is produced when NOx trap catalyst 13 is cold (S2) and therefore NOx trap catalyst 13 is to be quickly warmed up. Therefore, the split combustion mode can be used at the time when NOx trap catalyst 13 is cold, and NOx trap catalyst 13 can be warmed up to an activation temperature in a short time.

Moreover, according to this embodiment, the end of the preliminary combustion is the end of heat generation. Therefore, the combustion can be changed over to the main combustion after heat generation of the pilot combustion ends.

In a low engine load region, the preliminary combustion can be carried out plural times. In this case, the control system can achieve both targets of low smoke emission and high exhaust temperature under low-load conditions.

According to one of various possible constructions or interpretations, a combustion control apparatus according to the illustrate embodiment, includes at least: means (25, S3, S4, S5, 20-23, 50) for determining an estimated condition of the exhaust purifier; means for producing a split combustion request in accordance with the estimated condition of the exhaust purifier (S2~S14); and means for controlling fuel injection to the engine in a split combustion mode (S1102, S1103) in response to the split combustion request.

This application is based on a prior Japanese Patent Application No. 2003-193310 filed in Japan on Jul. 8, 2003. The entire contents of this Japanese Patent Application No. 2003-193310 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A combustion control apparatus for an internal combustion engine, comprising:
    an exhaust purifier in an exhaust passage of the internal combustion engine;
    a combustion controlling actuator to cause main combustion, and to cause preliminary combustion prior to the main combustion; and
    a controller to control fuel injection to produce the preliminary combustion, and to control fuel injection to start the main combustion after an end of the preliminary combustion;
    wherein the combustion controlling actuator includes a fuel injector to inject fuel directly into a combustion chamber of the engine; and the controller is configured to perform a preliminary fuel injection to produce the preliminary combustion at or near top dead center, and to perform a main fuel injection to start the main combustion after the preliminary combustion is finished such that a premixed combustion process is predominant in the main combustion, the preliminary fuel injection being immediately prior to the main fuel injection, and
    wherein the controller is configured to perform the preliminary fuel injection at such a timing as to cause a heat releasing process of the preliminary combustion to start before compression top dead center and to end after compression top dead center.

2. The combustion control apparatus as claimed in claim 1, wherein the controller is configured to delay the start of the main combustion with respect to the end of the preliminary combustion.

3. The combustion control apparatus as claimed in claim 1, wherein the controller is configured to perform the main fuel injection for the main combustion at a timing to start the main combustion after an end of a heat releasing process of the preliminary combustion.

4. The combustion control apparatus as claimed in claim 1, wherein the controller is configured to start the main fuel injection for the main combustion at a timing to inject fuel in a state in which flame subsides in the combustion chamber, to prevent diffusive combustion process in the main combustion.

5. The combustion control apparatus as claimed in claim 1, wherein the controller is configured to control a preliminary fuel injection quantity of the preliminary fuel injection to a smaller quantity required to increase an incylinder temperature in the combustion chamber, and to make a main fuel injection quantity of the main combustion greater than the preliminary fuel injection quantity, to produce engine torque with the main combustion.

6. The combustion control apparatus as claimed in claim 1, wherein the controller is configured to control a preliminary fuel injection quantity for the preliminary fuel injection equal to a fuel quantity required to make an incylinder temperature in the combustion chamber at a fuel injection timing of the main combustion, higher than or equal to an auto ignition temperature enabling spontaneous ignition in the combustion chamber.

7. The combustion control apparatus as claimed in claim 1, wherein an amount of retard of a combustion start timing of the main combustion with respect to a combustion start timing of the preliminary combustion is equal to or greater than 20° in crank angle.

8. The combustion control apparatus as claimed in claim 1, wherein an amount of retard of a combustion end timing of the main combustion with respect to compression top dead center is equal to or greater than 50° in crank angle.

9. The combustion control apparatus as claimed in claim 1, wherein the controller is configured to perform the preliminary fuel injection for the preliminary combustion during a compression stroke.

10. The combustion control apparatus as claimed in claim 1, wherein the controller is configured to vary at least one of a fuel injection quantity and a fuel injection timing of the preliminary fuel injection for the preliminary combustion in accordance with a compression end temperature which is a temperature in the combustion chamber at an end of a compression stroke.

11. The combustion control apparatus as claimed in claim 1, wherein the controller is configured to control an exhaust gas temperature of the engine by varying the fuel injection timing of the main combustion.

12. The combustion control apparatus as claimed in claim 1, wherein the controller is configured to control the main combustion so as to hold torque produced by the engine constant.

13. The combustion control apparatus as claimed in claim 1, wherein the combustion control apparatus further comprises the internal combustion engine which is a diesel engine.

14. The combustion control apparatus as claimed in claim 1, wherein the controller is configured to control the fuel injector to inject the fuel of the main fuel injection after the end of the preliminary combustion.

15. The combustion control apparatus as claimed in claim 1, wherein the controller is configured to perform the preliminary fuel injection to produce the preliminary combustion at the top dead center.

16. The combustion control apparatus as claimed in claim 1, wherein the controller is configured to control the combustion controlling actuator in a split combustion mode by controlling the fuel injection to produce the preliminary combustion at or near top dead center, and by controlling the fuel injection to start the main combustion after the end of the preliminary combustion when a split combustion request is produced to bring the exhaust purifier to an operative state.

17. The combustion control apparatus as claimed in claim 16, wherein the controller is configured to control the combustion controlling actuator normally in a normal combustion mode, and to change over a combustion control mode from the normal combustion mode to the split combustion mode in response to the split combustion request produced in accordance with a condition of the exhaust purifier.

18. The combustion control apparatus as claimed in claim 17, wherein the controller is configured to determine an estimated condition of the exhaust purifier and to produce the split combustion request in accordance with the estimated condition of the exhaust purifier, to request one of an increase in an exhaust gas temperature of the engine and a rich operation of the engine.

19. The combustion control apparatus as claimed in claim 18, wherein the combustion control apparatus further comprises a condition sensor to collect information needed to determine the estimated condition of the exhaust purifying section.

20. The combustion control apparatus as claimed in claim 16, wherein the exhaust purifier includes a particulate filter to collect exhaust particulate matter, and the controller is configured to produce the split combustion request in accordance with an estimated particulate matter quantity of the particulate matter accumulated in the particulate filter, to increase an exhaust gas temperature for auto oxidation of the particulate matter in the particulate filter.

21. The combustion control apparatus as claimed in claim 16, wherein the exhaust purifier includes an NOx trap catalyst device to trap NOx in a lean operation of the engine, and the controller (25) is configured to produce the split combustion request at a time to purify the NOx trapped in the NOx trap device.

22. The combustion control apparatus as claimed in claim 21, wherein the controller is configured to produce the split combustion request (Fsp) in accordance with an estimated NOx quantity (Qnox) of the NOx trapped in the NOx trap device.

23. The combustion control apparatus as claimed in claim 21, wherein the controller is configured to produce the split combustion request in accordance with a distance traveled by a vehicle powered by the internal combustion engine.

24. The combustion control apparatus as claimed in claim 16, wherein the exhaust purifier includes an NOx trap device to trap NOx in a lean operation of the engine, and the controller is configured to produce the split combustion request at a time to purify sulfur content trapped in the NOx trap device.

25. The combustion control apparatus as claimed in claim 24, wherein the controller is configured to produce the split combustion request in accordance with an estimated sulfur content quantity of the sulfur content trapped in the NOx trap device.

26. The combustion control apparatus as claimed in claim 24, wherein the controller is configured to produce the split combustion request in accordance with a distance traveled by a vehicle powered by the internal combustion engine.

27. The combustion control apparatus as claimed in claim 16, wherein the exhaust purifier includes an NOx trap catalyst device to trap NOx in a lean operation of the engine, and the controller is configured to produce the split combustion request at a time to warm up the NOx trap device.

28. The combustion control apparatus as claimed in claim 1, wherein the controller is configured to perform a plurality of preliminary fuel injections to cause a plurality of heat releasing processes for the preliminary combustion prior to the main combustion so that at least one of the heat releasing processes of the preliminary combustion is produced at or near top dead center.

29. The combustion control apparatus as claimed in claim 28, wherein the controller is configured to perform a plurality of preliminary fuel injections to cause a plurality of heat releasing processes for the preliminary combustion in a low engine load region.

30. A combustion control process for an internal combustion engine provided with an exhaust purifier in an exhaust passage of the internal combustion engine, the combustion control process comprising:
   controlling fuel injection to produce preliminary combustion in an engine cycle by performing a preliminary fuel injection to produce the preliminary combustion at or near top dead center; and
   controlling fuel injection to start main combustion after an end of the preliminary combustion in the engine cycle by performing a main fuel injection such that a premixed combustion process is predominant in the main combustion, the preliminary fuel injection being immediately prior to the main fuel injection,
   the preliminary fuel injection being performed at such a timing as to cause a heat releasing process of the preliminary combustion to start before compression top dead center and to end after compression top dead center.

31. The combustion control process as claimed in claim 30;
   determining an estimated condition of the exhaust purifier;
   producing a split combustion request in accordance with the estimated condition of the exhaust purifier;
   changeover a combustion control mode from a normal mode to a split combustion mode in response to the split combustion request; and
   controlling the fuel injection to produce the preliminary combustion and the fuel injection to start the main combustion after the end of the preliminary combustion in the split combustion mode.

32. The combustion control process as claimed in claim 30, wherein the preliminary fuel injection for the preliminary combustion is performed during a compression stroke.

33. The combustion control process as claimed in claim 30, wherein the preliminary fuel injection is performed at such a timing as to cause a heat releasing process of the preliminary combustion to start before a compression top dead center and to end after the compression top dead center.

34. The combustion control process as claimed in claim 30, wherein the start of the main combustion is delayed with respect to the preliminary combustion.

35. The combustion control process as claimed in claim 30, wherein the fuel of the main fuel injection is injected after the end of the preliminary combustion.

36. A combustion control apparatus for an internal combustion engine, comprising:
   means for determining an estimated condition of an exhaust purifier in an exhaust passage of the internal combustion engine;
   means for producing a split combustion request in accordance with the estimated condition of the exhaust purifier; and
   means for controlling fuel injection to the engine in a split combustion mode in response to the split combustion request by controlling fuel injection to perform a preliminary fuel injection to produce preliminary combustion and controlling fuel injection to perform a main fuel injection to start main combustion after an end of the preliminary combustion such that a premixed combustion process is predominant in the main combustion, the preliminary fuel injection being immediately prior to the main fuel injection, the means for controlling the fuel injection including means for performing the preliminary fuel injection at such a timing as to cause a heat releasing process of the preliminary combustion to start before compression top dead center and to end after compression top dead center.

37. The combustion control apparatus as claimed in claim 36, wherein the means for controlling the fuel injection to the engine in the split combustion mode includes means for decreasing a percentage of diffusive combustion in the main combustion and instead increasing a percentage of premixed combustion in the main combustion by delaying a start of the main combustion after the end of the preliminary combustion.

38. The combustion control apparatus as claimed in claim 36, wherein the fuel of the main fuel injection is injected after the end of the preliminary combustion.

* * * * *